United States Patent

Doushita et al.

[11] Patent Number: 6,156,409
[45] Date of Patent: Dec. 5, 2000

[54] NON-FOGGING ARTICLE AND PROCESS FOR THE PRODUCTION THEREOF

[75] Inventors: Kazuhiro Doushita; Kazutaka Kamitani; Toyoyuki Teranishi; Takashi Sunada, all of Osaka, Japan

[73] Assignee: Nippon Sheet Glass Co., Ltd., Osaka, Japan

[21] Appl. No.: 09/117,541

[22] PCT Filed: Dec. 8, 1997

[86] PCT No.: PCT/JP97/04494

§ 371 Date: Aug. 6, 1998

§ 102(e) Date: Aug. 6, 1998

[87] PCT Pub. No.: WO98/25761

PCT Pub. Date: Jun. 18, 1998

[30] Foreign Application Priority Data

Dec. 9, 1996 [JP] Japan ..................... 8-328175
Apr. 10, 1997 [JP] Japan ..................... 9-092352
Jul. 30, 1997 [JP] Japan ..................... 9-204049

[51] Int. Cl.[7] .................. B32B 5/16; B05D 5/02

[52] U.S. Cl. .................. 428/143; 428/141; 428/149; 428/428; 428/429; 428/331; 428/328; 427/190

[58] Field of Search .................. 428/141, 143, 428/149, 428, 429, 331, 328; 427/190

[56] References Cited

U.S. PATENT DOCUMENTS 5,134,021 7/1992 Hosono et al. .................. 428/213
5,674,625 10/1997 Takahashi et al. .................. 428/428

OTHER PUBLICATIONS

English Abstract of Japan Pub. No. 09–156959, dated Jun. 17, 1997 (See PCT Search Report).
English Abstract of Japan Pub. No. 5–16280, dated Jan. 26, 1993 (See PCT Search Report).
English Abstract of Japan Pub. No. 6–220428, dated Aug. 9, 1994.
English Abstract of Japan Pub. No. 4–328701, dated Nov. 17, 1992.
English Abstract of Japan Pub. No. 61–91042, dated May 9, 1986.

*Primary Examiner*—William P. Watkins, III
*Attorney, Agent, or Firm*—Armstrong, Westerman, Hattori, McLeland & Naughton

[57] ABSTRACT

The present invention is to provide an anti-fogging article which is excellent in durability, wear resistance, anti-fogging property and anti-fogging substainability property, wherein the same is an anti-fogging article in which a film having a metal oxide fine particles having a grain size from 4 through 300 nm and having metal oxides used as its matrix is coated on a substrate and dents and projections having an arithmetical mean roughness (Ra) from 1.5 to 80 nm and their mean interval (Sm) from 4 to 300 nm are formed on the abovementioned film surface, as necessary, the corresponding film contains a surface-active agent and a phosphate compound, and further as necessary, organosilane or its hydrolyzed substance containing in the molecule at least a functional group which is selected from a group consisting of polyalkylene oxide group, alkyl group, alkenyl group, and aryl group is covered on the corresponding dents and projections, and further as necessary, a surface-active agent layer is secured thereon or on the corresponding dents and projections.

41 Claims, No Drawings

NON-FOGGING ARTICLE AND PROCESS FOR THE PRODUCTION THEREOF

FIELD OF THE INVENTION

The present invention relates to anti-fogging article having an anti-fogging film or hydrophilic film formed on the surface of a substrate such as glass, ceramic, plastic or metal, and a method for producing the same. The abovementioned anti-fogging article according to the invention is used for buildings, vehicles, optical components, industrial applications, agriculture, daily-living articles, house materials, and medical equipment. The abovementioned anti-fogging article according to the invention is suitable, for example, for window glass, mirrors, lenses, fins of air conditioner heat exchanger, biomaterials, film sheets, showcases, etc. which are excellent in durability, wear resistance, anti-fogging, or hydrophilic property, etc.

BACKGROUND OF THE INVENTION

A phenomenon where glass or another article is fogged results from that minute water drops are adhered to the surface of the abovementioned articles (or are condensed thereon), and these minute water drops diffuse light. The fogging results in a remarkable lowering of the capacity of glasses, goggles, optical components of optical lenses, spoiling the appearance of window glass for buildings and mirrors, and restricting the place of use as building materials. Furthermore, if the abovementioned fogging occurs on window glass for vehicles including automobiles, the field of sight is restricted, resulting in a serious problem in view of safety.

As a method for solving such problems, there are some methods for preventing them, one of which is a method for coating a surface-active agent to the surface of articles such as glass (for example, Japanese Patent Publication No. 47926 of 1977), another of which is a method for coating a coating agent, the main component of which is hydrophilic absorption resin, to the surface thereof (for example, Japanese laid-open patent publication No. 220428 of 1994), still another of which is a method for fixing hydrophilic particles (for example, Japanese laid-open patent publication No. 328701 of 1992), and the other of which is a method for roughing the abovementioned surface (for example, Japanese laid-open patent publication No. 91042 of 1986).

However, as regards the surface of an article having a surface-active agent coated on glass or other article surface, the sustainability of anti-fogging property is low, and only a temporary effect can be obtained. Furthermore, there is another problem which is a lowering of clear transparency due to glaring or whitening.

Furthermore, the surface of an article obtained by a method for coating a coating agent, which is mainly composed of hydrophilic/absorption resin, to the surface of the abovementioned glass or article, has still another problem, that is, the wear resistance is low, and its durability is inferior to others.

Furthermore, with a method for fixing hydrophilic particles to the abovementioned glass or the surface of other articles, the obtained surface of the article cannot have a sufficient anti-fogging property, is liable to be stained, and the sustainability of the anti-fogging effect is low. Furthermore, with a method for roughing the surface, although such articles are produced by etching with hydrofluoric acid, there is such a problem where the surface of the obtained article has less anti-fogging effect with respect to breath air or steam.

In view of the abovementioned conventional shortcomings and problems, it is therefore an object of the invention to provide an anti-fogging article which is excellent in durability, wear resistance and sustainability of the anti-fogging effect, and a method for producing the same.

Disclosure of the invention

The invention relates to an anti-fogging article on which a film containing metallic oxide fine particles having a grain diameter from 4 through 300 nm and having a metallic oxide as a matrix is coated, wherein dents and projections having an arithmetic mean roughness (Ra) from 1.5 through 80 nm and a mean interval (Sm) from 4 through 300 nm are formed on the abovementioned film surface.

In the invention, by coating a coating solution, which is composed of metallic oxide fine particles, a hydrolyzable, condensable and polymerizable organometallic compound, a compound containing chlorosilyl group, or hydrolyzable substances thereof, onto the substrate, it is possible to form a film containing dents and projections on the surface of the substrate.

As the abovementioned metallic oxide fine particles, a metallic oxide colloid of a single constituent selected from a group consisting of silicon oxide (silica), aluminium oxide (alumina), zirconium oxide (zirconia), titanium oxide (titania), cerium oxide (ceria), or a metallic oxide fine particle consisting of metallic oxide fine particles, mixtures thereof, and complex metallic oxide of two or more constituents thereof may be used. These are preferably used in a form of solvent diffusion sol (colloid solution). The following are available as a metallic oxide sol; for example, sols dispersed in water, which are available on the market, such as "Snowtex-OL", "Snowtex-O", "Snowtex-OUP", "Snowtex-UP", which are silica sols made by Nissan Chemical Industries, Ltd., "Alumina sol 520 " which is an alumina sol also made by the same company, "NZS-30A" zirconia sol made by the same company, "CS-N", "STS-01", "STS-02" which are titania sols made by Ishihara Industries Co., Ltd., "Needler U-15" which is a ceria sol made by Taki Chemical Co., Ltd., "M-6" titania sol made by the same company, a silica sol dispersed in organic solvent which is also available on the market, such as "IPA-ST" or "XBA-ST" made by Nissan Chemical Industries Ltd., and titania sols dispersed in water-alcohol solvent including a binder, which are also available on the market, such as "ST-KO1" or "ST-K03" made by Ishihara Sangyo Co., Ltd.

It is preferable that the grain size of the abovementioned metallic oxide fine particles is from 4 through 300 nm. If the grain size of metallic oxide fine particles is less than 4 nm, the arithmetic mean roughness (Ra) is liable to become less than 1.5 nm and the mean interval (Sm) of dents and projections on a film of the surface of the substrate is liable to become less than 4 nm, no effective dent and projection to improve the anti-fogging capacity and anti-fogging sustainability can be formed, and it is not preferable. To the contrary, if the grain size of metallic oxide fine particles exceeds 300 nm, the arithmetic mean roughness (Ra) becomes 80 nm or more and the mean interval (Sm) of dents and projections of the abovementioned film exceeds 300 nm, wherein the dents and projections are too large, resulting in spoiling the transparency, and since the fine particles are liable to be deposited in the process of production, it is not favorable.

Chain fine particles are preferable as the abovementioned metallic oxide fine particles. By using chain fine particles, the shape of the surface dents and projections becomes three-dimensionally cubic and convex and concave, wherein it is possible to form surface dents and projections which have a high anti-fogging capacity and anti-fogging sustainability. "Snowtex-OUP" and "Snowtex-UP" which are silica sols made by Nissan Chemical Industries, Ltd. may be available as an example of chain colloids. These have a diameter from 10 through 20 nm and a length from 40 through 300 nm.

A dispersion solvent of the abovementioned metallic oxide fine particles is not specially specified if the metallic oxide fine particles are practically dispersed in stability. However, water, methanol, ethanol, or propanol alone or a combination thereof is preferable. Water is further preferable. Water or low-grade alcohol may be easily mixed with a solution containing the abovementioned metallic oxide fine particles, and it can be simply eliminated by drying when forming a film or a heat treatment after the film is formed. Of them, water is the most preferable in view of the production environment.

A dispersion assisting agent may be added to a solution containing the abovementioned organometallic compound and a compound including a chloroslyl group when adding the abovementioned metallic oxide fine particles to the solution. The dispersion assisting agent is not particularly limited. An additive generally used, for example, an electrolyte such as sodium phosphate, hexameta sodium phosphate, sodium pyrophosphate, aluminium chloride, ferric chloride, various kinds of surface-active agents, various kinds of organic macromolecules, silane coupling agents, titanium coupling agents, etc. may be used. The quantity of addition thereof is usually 0.01 through 5 weight percent with respect to the abovementioned metallic oxide fine particles.

A hydrolyzable, condensable, and polymerizable organometallic compound which is added to a coating solution for forming dents and projections along with the abovementioned metallic oxide fine particles may be basically any kind of compound which is hydrolyzable and polymerizable through dehydration. However, metal alkoxides or metal chelates are preferable.

As a metal alkoxide, for example, methoxide, ethoxide, propoxide, butoxide, etc. of silicon, aluminium, zirconium, titanium, etc. may be preferably used as a single body or mixture, and as a metal chelate, acetylacetonate complex of silicon, aluminium, zirconium, titanium, etc. may be preferably used.

Furthermore, as the abovementioned organometallic compound, alkylsilicate of macromolecular type, for example, "ethylsilicate 40" made by Colcoat Corp., and "MS56" made by Mitsubishi Chemical Ltd., etc. may be used.

As a hydrolyzed substance of the abovementioned metal oxide compound, alkoxysilane hydrolysis solution which is available on the market, such as "HAS-10" made by Colcoat Corp., "Ceramica G-91" or "Ceramica G-92-6" made by Nippan Lab. Corp., and "Atoron NSI-500" made by Nippon Soda Co., Ltd., etc. may be used.

A compound containing chlorosilyl group included in a coating solution for forming a dent and projection film along with the abovementioned metal oxide fine particles is a compound having at least one chlorosilyl group ($—SiCl_nX_{3-n}$, wherein n is 1, 2 or 3, X is hydrogen or alkyl group, alkoxy or acyloxy group, the number of carbon of which is from 1 through 10) in a molecule. Of them, a compound having at least two molecules of chlorine is more preferable, and chlorosilane and a condensed and polymerized substance thereof in which at least two molecules of hydrogen in silane $Si_nH_{2n+2}$ (wherein n is an integer from 1 through 5) are displaced for chlorine and the other hydrogen is displaced for the abovementioned alkyl group, alkoxy group, or acyloxy group, is preferable. For example, tetrachlorosilane (silicon tetrachloride $SiCl_4$), trichlorosilane ($SiHCl_3$), trichloromonomethylsilane ($SiCH_3Cl_3$), dichlorosilane ($SiCl_4Cl_2$), and $Cl—(SiCl_2O)_n—SiCl_3$ (n is an integer from 1 through 10), etc. may be listed.

A hydrolyzed substance of the abovementioned compound containing chlorosilyl group may be used, and a single body or mixture thereof may be also used. However, the compound containing chlorosilyl group which is most preferable is tetrachlorosilane. The chlorosilyl group is very reactive, and the same is able to form a fine film by self condensation or condensation with the surface of the substrate.

The solvent of a solution including the abovementioned organometaliic compound, or chlorosilyl group contained compound, or their hydrolyzed substances may be of any type which is able to practically dissolve the abovementioned organometallic compounds, chlorosilyl group contained compounds, or their hydrolyzed substances. However, alcohol such as methanol, ethanol, propanol, butanol, etc. is most preferable. The abovementioned metal compound, chlorosilyl group contained compound, and/or their hydrolyzed substances are caused to be contained at a concentration ratio from 1 through 30 percents by weight.

Water is requisite to hydrolyze the abovementioned organometallic compounds. This may be either acidic or neutral. However, in order to accelerate the hydrolysis, it is preferable that water which is acidified with hydrochloric acid, nitric acid, sulphuric acid, acetic acid, citric acid, sulfonic acid, etc. is used.

The quantity of addition of water necessary for the hydrolysis of the abovementioned organometallic compound may be 0.1 through 100 (molar ratio) with respect to the quantity of organometallic compounds. If the water addition quantity is less than 0.1 (molar ratio), the promotion of hydrolysis of organometallic compounds is not sufficient, and if the molar ratio exceeds 100, the solution is liable to be unstable. This is not preferable.

The quantity of addition of acid is not specially specified. However, it is better that the quantity thereof is 0.001 through 20 (molar ratio) with respect to the quantity of organometallic compounds. If the quantity of addition thereof is less than 0.001 (molar ratio), the promotion of hydrolysis of organometallic compounds is not sufficient, which is not preferable. And if the addition exceeds 20 (molar ratio), the acidity of the solution becomes too high. This is not preferable in handling the same. In view of only the hydrolysis, the upper limit of the quantity of addition of acid is 2 (molar ratio) with respect to the quantity of organometallic compound. If the quantity of acid is increased more than this, the degree of promotion of hydrolysis will not change. However, by increasing the quantity of addition of acid more than 2, there is a case where the film strength is remarkably increased and where a film which is able to sufficiently endure practical applications through drying at a low temperature (room temperature to 250° C.).

A preferable composition of a coating solution for which an increase of the film strength can be recognized is such that the concentration of metal oxides is 0.001 percents by weight or more and 3 percents by weight or less, the acid concentration is 0.001 moles per liter or more and 1 mole per liter or less, and the water content is 0.001 percents by weight or more and 10 percents by weight or less. A further preferable composition is such that the concentration of the abovementioned metal oxide is 0.01 percents by weight or more and 0.6 percents by weight or less, the acid concentration is 0.01 moles per liter or more and 0.3 moles per liter or less, and the water content is 0.001 percents by weight or more and 3 percents by weight or less. The acid which is used at this time is preferably nitric acid or hydrochloric acid. Furthermore, it is preferable that acid having a concentration which is lower 0.3 times than the water content is used. That is, when acid in a form of water solution is used, it is preferable that the acid is an acid having a concentration ratio of 23.1% or more. When the acid is used in a form of ethanol solution, it is preferable that the acid concentration in the ethanol solution is 0.15 percents by weight or more if the ethanol solution contains, for example, water content of 0.5 percents by weight.

In a case where the abovementioned chlorosilyl group contained compound is used, it is not a requisite that water or acid is added. Even though no water or acid is added, the hydrolysis is carried out with water contained in the solvent or water in the atmosphere. Furthermore, hydrochloric acid is made free in the solution in line with the hydrolysis, wherein the hydrolysis is further promoted. But, there is no problem if water or acid is additionally supplied.

If the content of the abovementioned metal oxide fine particles in a film is too small, an effect of adding metal oxide fine particles, that is, an anti-fogging property and anti-fogging sustainability is not sufficient. To the contrary, if the content of metal oxide fine particles is too large, the matrix phase of metal oxides resulting from organometallic compounds or chlorosilyl group contained compounds is made non-continuous to cause the dents and projections of film to be weakened, wherein the film is liable to be made weak, and further the anti-fogging property and anti-fogging sustainability obtained are saturated to cause no further practical improvement to occur. Therefore, it is preferable that the content of metal oxide fine particles is 5 percents by weight or more and 80 percents by weight or less when converted to the metal oxides. It is further preferable that the content is 10 percents by weight or more and 70 percents by weight or less and still further preferable that the content thereof is 20 percents by weight or more and 60 percents by weight or less.

The abovementioned metal oxide compound is mixed with the abovementioned organometallic compound, chlorosilyl group contained compound or their hydrolyzed substance along with a solvent. As necessary, water, acid catalyst and dispersion assisting agent is added thereto, and a coating liquid to form dents and projections on a substrate is adjusted. At this time, organometallic compound and chlorosilyl group contained compound may be used independently or may be used as a mixture thereof. A favorable blending ratio of the coating liquid is as shown in Table 1 below;

TABLE 1

| | |
|---|---|
| Organometallic compound, or chlorosilyl group contained compound or their hydrolyzed substance | 100 parts by weight |
| Metal oxide fine particles | 10 to 200 parts by weight |
| Water | 0 to 150 parts by weight |
| Acid catalyst | 0 to 35 parts by weight |
| Dispersion assisting agent | 0.001 to 10 parts by weight |
| Solvent | 500 to 30,000 parts by weight |

The abovementioned metal compound or chlorosilyl group contained compound is dissolved in a solvent, to which a catalyst and water are added, and hydrolysis is carried out for five minutes to two days at an appointed degree of temperature from 10° C. to the boiling point of the solution, wherein metal oxide fine particles are added to the solution along with a dispersion assisting agent as necessary. In this condition, if necessary, the solution is further hydrolyzed for five minutes to two days at an appointed degree of temperature from 10° C. to the boiling point thereof, whereby a coating liquid for forming dents and projections can be obtained. Furthermore, in a case where a chlorosilyl group contained compound is used, it is not a requisite that a catalyst and water are added thereto. Still furthermore, metal oxide fine particles may be added before the abovementioned hydrolysis process is started. Furthermore, in order to omit the hydrolysis process of organometallic compounds, a solution in which organometallic compounds are hydrolyzed, which is available on the market, may be used. Thereafter, the obtained coating liquid may be diluted by a suitable solvent in compliance with the coating method.

The coating liquid for forming dents and projections is coated on a substrate and dried or heat-treated as necessary, whereby metal oxide dents and projections are formed on the substrate.

As a substrate for the present invention, glass, ceramic, plastic or metal, etc. may be available. In a case where, for example, a plastic substrate, etc. having less hydrophilic property is used on the surface of the abovementioned substrate, the surface is plasma-treated or corona-discharged in advance in order to make it hydrophilic, or is subjected to irradiation of ultraviolet rays having a wavelength from around 200 through 300 nm, in an atmosphere including oxygen, for hydrophilic treatment. Thereafter, it is preferable that the abovementioned coating is performed.

Furthermore, although there is a case where the coating liquid for forming dents and projections is not uniformly coated by being shed according to stained conditions on the substrate, this can be improved by washing the surface of the substrate or improving the quality thereof. As a method of washing or improving the quality, many ways, that is, de-oiling washing by an organic solvent such as alcohol, acetone, hexane, etc., washing with alkali or acid, polishing the surface with a polishing agent, ultrasonic cleaning, irradiation of ultraviolet rays, ozone treatment with ultraviolet rays, plasma treatment, corona discharge treatment, heat treatment, etc. are available.

The abovementioned coating method may depend upon an already known technique, and it is not specially specified. There are many methods which are a method of using a device such as a spin coater, roll coater, spray coater, curtain coater, etc., an immersing method (dip coating method), a flow-coating method, and various kinds of printing methods such as a screen printing, gravure printing, curved printing, etc.

After the coated substrate is dried at the appointed temperature from the room temperature to 150° C. for one minute to two hours, heat treatment is carried out at the appointed temperature from 150° C. to the heat resisting temperature of the substrate for five seconds to five hours as necessary. The heat resisting temperature of the substrate is the temperature which is the upper limit of temperature at which the substrate is able to retain its physical properties, wherein as regards glass substrate, for example, a softening point and transparency losing temperature (usually 600° C. to 700° C.), etc., are included in this category, and as regards plastic substrate, for example, glass transition point, crystalization point, and decomposing point, etc. are included therein.

By the abovementioned drying and heat treatment, tough dents and projections of metal oxides are formed on the surface of a substrate. These dents and projections are formed of a matrix of metal oxide fine particles and metal oxides (resulting from organometallic compounds or chlorosilyl group contained compound), wherein metal oxide fine particles are fixed and adhered to the substrate by a metal oxide matrix, and the surface of the metal oxide fine particles form dents and projections of the film. It is preferable that the thickness of the dent and projection film is from 2 through 300 nm, and it is further preferable that the thickness is from 4 through 100 nm.

If the thickness is thinner than 2 nm, the effect of dents and projections is very low, that is, the anti-fogging property is low and is not preferable. If the thickness is greater than 300 nm, the interference color is recognized to be remarkable and is not preferable. Furthermore, if the thickness is less than 4 nm, the anti-fogging sustainability is liable to be lowered, and if the thickness is greater than 100 nm, the wear resistance is liable to be lowered. Both of them are not preferable. A further preferable thickness of the dent and projection film is from 20 through 100 nm. The thickness of the dent and projection film is defined by the difference between the inside surface of the film and the average line of the outside dents and projections.

Articles, on which dents and projections are thus formed on the surface of substrates, improve the slippage property of water, have a low contact angle with water drops, and have an anti-fogging property. Furthermore, even though the surface thereof is more or less stained, the contact angle is not easily increased to cause the anti-fogging property to be sustained.

Furthermore, if light such as ultraviolet rays, etc. is irradiated on the surface of the anti-fogging article in a case where titanium oxide is used as metal oxide fine particles and matrix, there is a case where the surface stains can be decomposed by a light catalyst action and the anti-fogging property is improved. As regards such articles, the anti-fogging property can be semi-permanently sustained under light such as sunlight, fluorescent lamp, etc.

It is preferable that the dent and projection film according to the invention is formed so as to have an arithmetic mean roughness (Ra) from 1.5 through 80 nm and a mean interval (Sm) of dents and projections from 4 through 300 nm, by adjusting the grain size, grain shape of metal oxide fine particles in the abovementioned coating solution, a mixture ratio and solid content concentration of organometallic compounds, chlorosilyl group contained compound, or their hydrolyzed substances with metal oxide fine particles.

In a case where the abovementioned Ra value is smaller than 1.5 nm or larger than 80 nm, the anti-fogging property and anti-fogging sustainability are low, and it is not preferable. Furthermore, if the abovementioned Sm value is smaller than 4nm or larger than 300 nm, the anti-fogging property and anti-fogging sustainability are low, and it is not preferable. In particular, if the Sm value exceeds 300 nm, the transparency may be spoiled to be not preferable. It is further preferable that the dent and projection film according to the invention has an arithmetic mean roughness (Ra) from 5 through 30 nm and a mean interval (Sm) from 5 through 150 nm with respect to the dents and projections, wherein in this range, the anti-fogging property and especially the anti-fogging sustainability are further preferable. Herein, Ra value and Sm value are defined by a description method regulated in the Japanese Industrial Standards JIS B 0601 (1994), and they can be calculated on the basis of section curves observed and measured by an atomic force microscope (for example, Seiko Electronic Co., Ltd., Type SPI3700) and an electron microscope (for example, Hitachi, Limited, Type H-600).

If a surface-active agent is included in the dent and projection film including the abovementioned metal oxide fine particles, the matrix of which is metal oxide, it is possible to obtain an anti-fogging article, the anti-fogging property and anti-fogging sustainability of which are further improved. As a method of impregnating a surface-active agent in the dent and projection film, a method of adding a surface-active agent to the coating solution for forming the abovementioned dents and projections is simple and preferable. The surface-active agent impregnated in the dent and projection film is caused to slowly move onto the surface of a dent and projection film to cause the interfacial force of water drops, which are dew-condensed, to be lowered, thereby causing the spread resulting from slippage of water drops to be increased and causing the anti-fogging property to be further increased. Furthermore, the surface-active agent will cover stain constituents and take a role of preventing the anti-fogging property from being lowered due to stains.

The surface-active agent impregnated in the dent and projection film is retained in clearances formed by metal oxide fine particles and thin pores of the metal oxide matrix and slowly moves onto the surface, wherein the surface-active agent contributes to improvement of the anti-fogging property and hydrophilicity. Therefore, the anti-fogging property or hydrophilicity of a dent and projection film is further improved than that of the dent and projection film not having any surface-active agent. Furthermore, since high anti-fogging property effected by dents and projections can be retained even though the surface-active agent gradually flows out through use and no further surface-active agent which can move from inside the film onto the surface is left over, a group lowering of the anti-fogging property does not occur.

In the present invention, a negative-ionized surface-active agent is preferable as a surface-active agent used to be contained in the dent and projection film. Since a positive-ionized or ampholytic surface-active agent has such a tendency where the surface-active agent is adsorbed onto the dent and projection film consisting of metal oxides with the hydrophilic portion of positive ions oriented thereto, the hydrophobic portion of the surface-active agent is oriented to the air side. Resultantly, since the hydrophilicity on the surface of articles is liable to be lowered to cause the anti-fogging property to be decreased, positive ionized or ampholytic surface-active agents are not preferable. As regards non-ionized surface-active agents, there are many cases where the molecular weight thereof is large, and they are liable to be fixed in the film. Similarly, the hydrophobicity on the surface of articles is lowered to cause the anti-fogging property to be spoiled. Therefore, a non-ionized surface-active agent is not preferable.

Furthermore, a surface-active agent having amine nitrogen or amide bond is liable to be adsorbed onto the dent and projection film composed of metal oxides via nitrogen atoms regardless of ion polarity, wherein the anti-fogging property is also lowered. Therefore, the surface-active agent is not preferable. Accordingly, a surface-active agent not containing any amine nitrogen or amide bond in molecules is preferably used.

As a negative-ionized surface-active agent, sulfosuccinic acid ester salt like dialkyl sodium sulfosuccinate, alkylether sulfate, alkylether phosphate, alkylether carbonate are available, and ester salt sulfate, etc. like sodium dodecylbenzene sulfonate is also available. Of them, dialkyl sodium sulfosuccinate, for example, dibutyl sodium sulfosuccinate, dihexyl sodium sulfosuccinate, or di-2-ethylhexyl sodium sulfosuccinate, etc. has a good anti-fogging preventing property and anti-fogging sustainability and is preferably used. These surface-active agents may be used alone or may be used with two or more kinds thereof mixed.

It is preferable that the quantity of a surface-active agent contained in the dent and projection film according to the invention is from 0.1 to 15 percents by weight with respect to the entire dent and projection constituents containing metal oxide fine particles and using metal oxides as a matrix. If the content of surface-active agent is 0.1 weight percent or less, improvement of the anti-fogging property and hydrophilicity is not sufficient, and addition of the surface-active agent does not have any meaning. It is not preferable. On the other hand, if the content thereof exceeds 15 percents by weight, the film is whitened to cause the appearance to be worsened, and furthermore the film strength will be lowered. It is also not preferable.

The dent and projection film including the abovementioned surface-active agent is dried and heat-treated at a temperature lower than the decomposing temperature of the surface-active agent after the film is produced.

By further adding a phosphate compound to the dent and projection film or the dent and projection film containing a surface-active agent according to the invention, it is possible to obtain an anti-fogging article, the anti-fogging property and anti-fogging sustainability of which are further improved. As a method for causing a phosphate compound to be contained in a dent and projection film, a method for adding a phosphate compound into the abovementioned coating liquid for forming dents and projections is simple and preferable.

As the abovementioned phosphate compound, ester phosphate, phosphoric acid, phosphorus oxide, ester phosphite, phosphorous acid, etc. are listed. One or more of these chemical compounds may be used. It is preferable that the content of the abovementioned phosphate compound includes metal oxide fine particles and is from 0.1 to 15 percents by weight with respect to all the constituents of the dent and projection film, the matrix of which is a metal oxide. If the content of surface-active agent is less than 0.1 weight percent, the anti-fogging property and hydrophilicity are not sufficiently improved. On the other hand, if the content thereof exceeds 15 percents by weight, the film is whitened to cause the appearance to be liable to be worsened, and furthermore the film strength will be lowered. It is also not preferable.

Organosilane or its hydrolyzed substance containing in the molecule at least a functional group which is selected from a group consisting of polyalkylene oxido group, alkyl group, alkenyl group, and aryl group is brought into contact with the dent and projection film (regardless of whether the film includes or does not the abovementioned surface-active agent or phosphate compounds), which contains the abovementioned metal oxide fine particles and has a metal oxide as its matrix, and the same is chemically or physically fixed or adhered to the dents and projections on the surface, whereby it is possible to obtain an anti-fogging article, the anti-fogging sustainability of which is further improved.

Polyethylene oxido group, polypropyrene oxido group, etc. may be mainly used as the abovementioned polyalkyl oxido group. As the abovementioned alkyl group, a chain alkyl group having a carbon atom number from 1 to 10 such as methyl group, ethyl group, propyl group, butyl group, pentyl group, hexyl group, octyl group, nonyl group, decyl group, etc. etc., and ring alkyl group having a carbon atom number from 3 to 10 such as cyclopentyl group, cyclohexyl group, etc. may be mainly used. As the abovementioned alkenyl group, a group having a carbon atom number from 1 to 10 such as vinyl group, allyl group, butenyl group, propenyl group, hexenyl group, octenyl group, cyclohexenyl group, etc. is mainly used. Phenyl group, tolyl group, xylyl group, etc. may be mainly used as the abovementioned aryl group.

Since these functional groups are nonpolar or has low polarity, stains are less adhered to cause an increase of the contact angle to be suppressed with respect to water drops, that is, it is preferable since the anti-fogging sustainability is improved. In particular, as regards the abovementioned anti-fogging articles which are produced by using organosilane including polyalkylene oxido group, the anti-fogging property is excellent and the anti-fogging sustainability is specially excellent.

Since the abovementioned functional groups is nonreactive or has low reaction property, no chemical combination with stains is produced to cause stains not to be fixed on the surface. Therefore, since stains adhered onto the surface can be simply eliminated by wiping, etc., the anti-fogging property can be simply revived even though the anti-fogging property is gone away due to stains.

It is preferable that the abovementioned organosilane is alkoxysilane or chlorosilane containing alkoxyl group or chloro group in the molecule. Since these functional groups are easily subjected to hydrolysis and organosilane is toughly chemically combined to the surface of dents and projections of metal oxides, it is possible to obtain products, the anti-fogging sustainability of which is further improved. Of the abovementioned organosilane, polyalkylene oxido group, for example, lkoxysilane containing polyethylene oxido group, particularly [alkoxy (polyethylene oxy) alkyl] trialkoxysilane, for example, [methoxy (polyethylene oxy) propyl] [trimethoxysilane] is most preferable.

It is preferable that an anti-fogging article for which the abovementioned organosilane or its hydrolyzed substance is chemically or physically fixed or adhered to the dent and projection surface thereof has a contact angle of 10 degrees or less (with respect to water drops of 0.4 mg). If the contact angle exceeds 10 degrees, that is not preferable since the anti-fogging property and anti-fogging sustainability are lowered.

A method for chemically or physically fixing or adhering the abovementioned organosilane or its hydrolyzed substance to the abovementioned dent and projection surface, any type of method for causing the abovementioned organosilane or its hydrolyzed substance to be chemical or physically brought into contact the abovementioned dent and projection surface may be available. For example, a method for coating a liquid containing the abovementioned organosilane or its hydrolyzed substance onto the dent and projection surface (that is, coating method), a method for immersing a dent and projection film formed article into a liquid containing the abovementioned organosilane or its hydrolyzed substance (that is, a liquid phase chemical adsorption method), a method for placing a dent and projection film formed article in steam of the abovementioned organosilane or its hydrolyzed substance and adsorbing the same there on (that is, gas phase chemical adsorption method) may be listed.

Of the abovementioned methods, the abovementioned coating method may depend upon an already known technique, and it is specially preferable. There are many methods which are a method of using a device such as a spin coater, roll coater, spray coater, curtain coater, etc., an immersing method (dip coating method), a flow-coating method, a method for rubbing the dent and projection surface with a cloth or paper impregnated with a coating liquid in a state where the cloth or paper is brought into contact with the surface (rubbing method), and various kinds of printing methods such as a screen printing, gravure printing, curved printing, etc.

Furthermore, although there is a case where the organosilane coating liquid is not uniformly coated by being shed depending on a dent and projection film coated on the matrix surface and including metal oxide fine particles, wherein metal oxides are the matrix thereof, this can be improved by washing the surface of the substrate or improving the quality thereof.

As a method of washing or improving the quality, many ways, that is, de-oiling washing by an organic solvent such as alcohol, acetone, hexane, etc., washing with alkali or acid, ultrasonic cleaning, irradiation of ultraviolet rays, ozone treatment with ultraviolet rays, plasma treatment, corona discharge treatment, heat treatment, etc. are available.

A solvent for dissolving the abovementioned organosilane is not specially limited. However, preferably, water, alcohol, ketone, etc. may be employed along or by combination thereof in view of safety, cost, and operation efficiency. Methanol, ethanol, propanol, butanol, etc. may be listed as alcohol, etc. Acetone, methylethyl ketone, diethyl ketone, etc. may be employed as ketone, etc.

The abovementioned organosilane may be hydrolyzed for use as necessary. Water and acid catalyst may be added to organosilane as necessary, wherein hydrolysis is carried out for a fixed period of time at a fixed temperature, and organosilane is diluted for use as necessary.

Although the conditions of hydrolysis of organosilane are not specially limited, it is preferable that the hydrolysis is carried out for three minutes to fifty hours in an range of temperature from 20° C. to 60 ° C. In a case where the temperature is lower than 20° C. or the time is less than 3 minutes, the promotion of hydrolysis is not sufficient. To the contrary, if the temperature is higher than 60° C. and the time exceeds 50 hours, the effect of promotion of hydrolysis can not be enhanced, the service life of the coating liquid is shortened. Therefore, that is not preferable.

As the abovementioned acid catalyst, mineral acids such as hydrochloric acid, sulphuric acid, nitric acid, etc., and organic acids such as acetic acid, formate acid, citric acid, para-toluenesulfonic acid, etc. may be used. The quantity of addition of acid is not specially limited. However, it is good that the quantity of addition of acid is from 0.0001 to 2 (molar ratio) with respect to organosilane. If the quantity of addition of acid is less than 0.0001 (molar ratio), promotion of hydrolysis of organosilane is not sufficient, and if the same exceeds 2 (molar ratio), the effect of hydrolysis promotion is no more improved. The acid becomes excessive to be unfavorable.

Though the quantity of water added for the abovementioned hydrolysis is not specially limited, it is good that the quantity is 0.1 or more (molar ratio) with respect to organosilane. If the quantity is less than 0.1 (molar ratio), promotion of the hydrolysis of organosilane is not sufficient to be unfavorable.

On the other hand, as regards organosilane, the hydrolysis speed of which is fast like, for example, chlorosilane, sufficient hydrolysis can be carried out with only water adsorbed on the dent and projection surface of metal oxides, wherein there is a case where organosilane can be fixed on the surface by a dehydration condensation reaction. In this case, since an anti-fogging article which is superior in view of weathertightness, anti-fogging property and anti-fogging sustainability, can be obtained, it is preferable that a coating liquid is prepared by using a non-water oriented solvent with the dissolved water sufficiently decreased. As a non-water oriented solvent, n-hexane, cychlohexane, xylene, toluene, etc. may be listed.

Furthermore, the concentration of organosilane used for coating is not specially limited, organosilane of 0.001 through 5 percents by weight is preferably used. If the concentration is lower than 0.001 percents by weight, no sufficient promotion of anti-fogging sustainability of an anti-fogging article obtained can be recognized, and if the concentration exceeds 5 percents by weight, the anti-fogging property is not improved anymore. Therefore, that is not economical and is not preferable.

It is preferable that the dent and projection substrate on which organosilane solution is coated is dried or heat-treated at a temperature from 20 through 180° C. for three minutes to three hours. By this treatment, combination of organosilane with metal oxides is strengthened to cause the durability and anti-fogging sustainability of an anti-fogging article to be improved. If the temperature is less than 20° C. or the treatment time is shorter than three minutes, the abovementioned effect is not sufficient to be unfavorable. Since there is a case where organosilane is decomposed if the temperature is higher than 180° C. That is also unfavorable. Furthermore, even though the treatment time exceeds three hours, no more effect can be expected. Therefore, that is also unfavorable in view of the productivity.

If organosilane forms a simplex molecular layer on the abovementioned dent and projection surface, the anti-fogging sustainability can be improved, and since the thickness of organosilane exceeds 10nm, the effect is not increased any more, a preferable thickness of the organosilane layer after heat treatment is from 0.3 through 10 nm. Even in a case where the thickness of organosilane layer is comparatively large, it is necessary that the thickness of organosilane layer is not greatly fluctuated on places, and it is necessary that dents and projections which are similar to those of the abovementioned dent and projection surface, that is, dents and projections having an arithmetical mean roughness (Ra) from 1.5 to 80 nm and an average interval (Sm) of the dents and projections from 4 to 300 nm, are formed on the outside surface of the organosilane layer.

If a layer of surface-active agent is further coated onto the dent and projection film (regardless of whether or not the layer includes the abovementioned surface-active agent or phosphate compound) including the abovementioned metal oxide fine particles and having metal oxides as its matrix, or onto a layer of organosilane (or its hydrolyzed substance) including the abovementioned functional group covered on the dent and projection film surface, it is possible to obtain anti-fogging articles, the anti-fogging property and anti-fogging sustainability of which are further improved.

The abovementioned layer of surface-active agent is able to reduce the surface tension of dew-condensed water drops, wherein slippage of water drops is improved, and an effect of the anti-fogging property is further increased. Furthermore, the abovementioned layer of surface-active agent wraps stain constituents up and takes a role of preventing the anti-fogging property from being lowered due to stains on the surface.

Since the abovementioned surface-active agent layer is hardly eliminated due to its physical properties of the surface dent and projection film (dent and projection film including metal oxide fine particles and having metal oxides as its matrix) which is the underground thereof, the anti-fogging effect brought by the surface-active agent can last longer than a case where the surface-active agent is coated on a usual smooth substrate surface not having any dent and projection. Furthermore, as regards articles provided with a layer of organosilane, etc. including the abovementioned functional groups on the abovementioned dent and projection film surface, the surface-active agent is hardly eliminated by virtue of mutual acting force among molecules between the abovementioned functional group and surface-active agent on the layer surface in addition to the abovementioned physical shape, wherein the anti-fogging effect can be further improved by the surface-active agent.

In a case where the thickness of the coated surface-active agent layer is comparatively small in the range described later, dents and projections having an arithmetical mean roughness (Ra) from 1.5 to 80 nm and a mean interval (Sm) of dents and projections from 4 to 30 nm are formed by influences of its underground surface on the surface (outside) of the surface-active agent, whereby a higher anti-fogging property can be produced by the dent and projection shape. If the thickness of the surface-active agent layer is comparatively large, dents and projections formed on the surface (outside) of the surface-active agent layer do not become larger than 1.5 nm in view of the arithmetical mean roughness (Ra) and do not become larger than 4 nm in view of the mean interval (Sm) of dents and projections, wherein although the layer surface of the surface-active agent is made smooth, the anti-fogging effect is brought by the surface-active agent itself. As the surface-active agent is gradually flown out through continued use to cause the thickness of the surface-active agent layer to be decreased, dents and projections are caused to appear on the surface, wherein a higher anti-fogging property can be maintained by its dent and projection shape.

Non-ionized or negative-ionized surface-active agent is favorably used to be coated on the abovementioned surface. Since positive-ionized or ampholytic surface-active agent has such a tendency where the surface-active agent is adsorbed onto the dent and projection surface consisting of metal oxides with the hydrophilic portion of positive ions oriented thereto, the hydrophobic portion of the surface-active agent is oriented to the air side. Resultantly, since the hydrophilicity on the surface of articles is liable to be lowered to cause the anti-fogging property to be decreased, the positive ionized or ampholytic surface-active agent is not preferable to use.

Furthermore, a surface-active agent having amine nitrogen or amide combination is liable to be adsorbed onto the dent and projection film composed of metal oxides via nitrogen atoms regardless of ion polarity, wherein the anti-fogging property is also lowered. Therefore, the surface-active agent is not preferable. Accordingly, a surface-active agent not containing any amine nitrogen or amide combinations in molecules is preferably used.

However, articles provided with a layer of organosilane including the abovementioned functional group on its surface, the adsorption tendency of the abovementioned surface-active agent is lowered, a positive-ionized or ampholytic surface-active agent and a surface-active agent containing amine nitrogen or amide combinations in molecules are also favorably used.

As a negative-ionized surface-active agent, sulfosuccinic acid ester salt like dialkyl sodium sulfosuccinate, alkylether sulfate, aikylether phosphate, alkylether carbonate are available, and ester salt of sulfate like sodium dodecylbenzene sulfonate, etc. is also available. Of them, dialkyl sodium sulfosuccinate, for example, dibutyl sodium sulfosuccinate, dihexyl sodium sulfosuccinate, or di-2-ethylhexyl sodium sulfosuccinate, etc. has a good anti-fogging preventing property and anti-fogging sustainability and is preferably used.

As a non-ionized surface-active agent, there are available, polyoxyethylene alkyl ether like polyoxyethylene nonyl phenyl ether, polyoxy ethylene stearyl ether; polyoxy ethylene acyl ester like polyoxy ethylene monostearate; polyoxy ethylene sorbitan acyl ester like polyoxy ethylene sorbitan monostearate; sorbitan ester like sorbitan laurate, etc.

A non-ionized surface-active agent which has a hydrophilicity/lipophilicity balance value (HLB) from 5 through 18 is preferable. If the HLB value is smaller than 5, the hydrophilicity is low, where sufficient anti-fogging property can not be obtained. On the other hand, if the HLB value is larger than 18, the solubility with water becomes too high to cause the surface-active agent to be easily eliminated from the surface due to dew condensation. Therefore, the sustainability of the anti-fogging effect is decreased to be unfavorable. The surface-active agent to be coated on the abovementioned surface may be used alone or with two or more kinds thereof mixed.

Though the thickness of the abovementioned surface-active agent after being coated is not specially limited, the thickness may be roughly from 0.2 to 100 nm. If the thickness of surface-active agent is thinner than 0.2 nm (simplex molecular layer), dews may be condensed at some places on the surface, wherein the anti-fogging property and anti-fogging sustainability resulting from the surface-active agent is not remarkably promoted to be unfavorable. On the contrary, if the thickness is larger than 100 nm, interference color may be obtained, resulting from the surface-active agent, wherein unevenness and imbalance can be recognized. That is also unfavorable. A more preferable thickness thereof is from 10 to 100 nm.

An already-known method may be used for coating a surface-active agent without any special limitation. However, there are many methods which are; a method of using a device such as a spin coater, roll coater, spray coater, curtain coater, etc.; an immersing method (dip coating method); a flow-coating method; a method for rubbing the dent and projection surface with a cloth or paper impregnated with a coating liquid in a state where the cloth or paper is brought into contact with the surface (rubbing method); and various kinds of printing methods such as a screen printing, gravure printing, curved printing, etc.

A solvent for dissolving the abovementioned surface-active agent for coating is not specially limited. However, preferably, water, alcohol, etc. may be employed along or by combination thereof in view of safety, cost, and operation efficiency. Methanol, ethanol, propanol, butanol, etc. may be listed as alcohol, etc.

Furthermore, although the concentration of surface-active agent used for coating is not specially limited, it is preferable that the concentration thereof is from 0.001 to 5 percents by weight. If the concentration is lower than 0.001 percents by weight, the thickness of the surface-active agent on an anti-fogging article obtained is too small to hardly recognize any improvement of the anti-fogging property and anti-fogging sustainability, and if the concentration is larger than 5 percents by weight, the anti-fogging property will not be improved any more. That is not preferable in view of economicality.

Furthermore, a surface-active agent may be coated onto the abovementioned anti-fogging article which is in use or after use, for the purpose of regaining a lowered anti-fogging property.

BEST MODES FOR CARRYING OUT THE INVENTION

Hereinafter, embodiments are described.

[Embodiment example 1]

FORMATION OF SURFACE DENTS AND PROJECTIONS

Hydrolyzed, condensed, and polymerized liquid (brand name: HAS-10, Colcoat Corp.) of tetraethoxysilane, 11.8 parts by weight; chain silica colloids having a diameter from 10 to 20 nm and a length from 40 to 300 nm (brand name: Snowtex OUP, Nissan Chemical Industries, Ltd., Solid content: 15 percents by weight), 13.3 parts by weight; and 2-propanol, 74.9 parts by weight, were blended at a room temperature, and the same was diluted three weight times with 2-propanol, and was agitated at a room temperature for two hours, wherein a coating liquid for forming dents and projections was obtained.

Soda lime silicate glass plate (65 mm×150 mm×3 mm) having its surface polished by a ceric oxide oriented polishing agent, which is washed, further ultrasonically cleaned in pure water and dried, was immersed in the abovementioned coating liquid for forming dents and projections and was lifted up at a rate of 20 cm per minute to cause the liquid to be coated on both sides of the glass plate. The glass plate was dried at 100° C. for thirty minutes and further dried at 250° C. for thirty minutes. Thereafter, the glass plate was heated treated in an oven, the temperature of which is 500° C., for one hour, whereby a glass plate having a silica dent and projection film 100 nm thick on both sides thereof was obtained.

MEASUREMENT OF SURFACE ROUGHNESS AND CONTACT ANGLE

As regards the glass plate on which the abovementioned silica dent and projection film was formed, the arithmetical mean roughness (Ra) and mean interval (Sm) of dents and projections were obtained by using an atomic force microscope (for example, Seiko Electronic Co., Ltd., Type SPI3700).

Furthermore, the contact angle with respect to a water drop of 0.4 mg was measured by using a contact angle gauge (Kyowa Kaimen Kagaku Co., Ltd., "CA-DT"). These measurement results are shown in Table 4. Furthermore, Ra and Sm before and after a surface-active agent is coated are shown for anti-fogging articles having a surface-active agent on their top surface in other embodiments and comparison controls.

EVALUATION OF ANTI-FOGGING PROPERTY

After a glass plate having the abovementioned silica dent and projection film formed is placed in a constant-temperature humidistat chamber, the temperature and relative humidity of which respectively are 5° C. and 10%, for ten minutes, the same is transferred to a constant-temperature humidistat chamber, the temperature and relative humidity of which respectively are 25° C. and 70%, wherein the fogging was observed from the point when 30 seconds elapsed to the point when two minutes elapsed, and the distortion of penetration image after two minutes elapsed was observed, and minute water drop adhered state on the surface of the glass plate was investigated, wherein "fogging evaluation" and distortion evaluation" were measured in compliance with the four-level evaluation reference shown in Table 2.

TABLE 2

| Fogging evaluation | Fogging state |
| --- | --- |
| ⊚ | Not fogging at all |
| ◯ | Only slightly fogging |
| Δ | Slowly but thickly fogging |
| X | Thickly fogging soon |

| Distortion evaluation | Distorted state of penetration image |
| --- | --- |
| ⊚ | Not distorted at all |
| ◯ | Only slightly distorted |
| Δ | Considerably distorted |
| X | Remarkably distorted |

The measurement results are shown in Table 4. It was found that a glass plate on which the abovementioned silica dent and projection film was formed has an excellent initial anti-fogging property.

REPEATING ANTI-FOGGING PROPERTY

The abovementioned sample plate is placed on a cooling device (made of transparent plastic) regulated in JIS S 4030-1995 "Method for testing anti-fogging agents for glasses", wherein the rear side of the sample plate was brought into contact with cooling water, and the sample temperature was kept at 20° C. The sample plate cooled in this state was placed in a constant temperature humidistat chamber, the temperature and relative humidity of which are 45° C. and 85%, for three minutes. Thereafter, the sample plate was placed in a constant temperature humidistat chamber, the temperature and relative humidity (RH) of which are 20° C. and relative humidity is 10%, and was dried for three minutes. This operation consisting of being exposed to the high temperature atmosphere and being exposed to the low temperature atmosphere is regarded as one cycle. Thirty cycles were repeated. After the repeated operation was over, a test chart for judging penetration distortion, which is printed on a plastic plate, was adhered to the rear side of the abovementioned cooling device, water was caused to soak into the clearance between the plate and the rear side of the cooling device, and the test chart for judging penetration distortion was observed from the sample side. The test chart for judging penetration distortion is made similar to a test chart shown in FIG. 1 attached to JIS S 4030-1995, wherein the line width and interval of three lines are respectively 0.5 mm, 1.0 mm, 1.5 mm, 2.0 mm and 2.5 mm to make five groups. The cooling water temperature of the cooling device to which the sample is attached was cooled down to 5° C., and the device was placed in a constant-temperature humidistat chamber, the temperature and relative humidity of which are 25° C. and 80%, wherein generation of fogging and penetration distortion was investigated by using the abovementioned test chart for judging penetration distortion, and the "fogging evaluation" and "distortion evaluation" of the repeating anti-fogging property were measured in compliance with 6-level evaluation reference shown in Table 3.

TABLE 3

| Fogging evaluation | Fogging state |
| --- | --- |
| 5 | Hardly fogging on the entire surface. |
| 4 | 80% or more area not fogging. |
| 3 | 60% or more area not fogging. |
| 2 | 60% or more area fogging. |
| 1 | 80% or more area fogging. |
| 0 | Almost fogging on the entire surface. |

| Distortion evaluation | Penetration distortion |
| --- | --- |
| 5 | Not distorted at all |
| 4 | White lines having an interval of 0.5 mm cannot be recognized clearly. |
| 3 | White lines having an interval of 1.0 mm or less cannot be recognized clearly. |
| 2 | White lines having an interval of 1.5 mm or less cannot be recognized clearly. |
| 1 | White lines having an interval of 2.0 mm or less cannot be recognized clearly. |
| 0 | White lines having an interval of 2.5 mm or less cannot be recognized clearly. |

The results of measurement are shown in Table 4. It was found that the glass plate on which the abovementioned silica dent and projection film was formed has a repeating anti-fogging property to some degrees.

TOBACCO SMOKE TEST

A glass plate on which the abovementioned silica dent and projection film was formed was placed on the bottom of a cubic box, the side of which is 24 cm, smoke equivalent to one cigarette which is available on the market was introduced into the box, and the glass plate was taken out after it was placed therein for thirty minutes. The contact angle with respect to 0.4 mg water drops measured by the abovementioned method and the anti-fogging property evaluation results carried out by the abovementioned method, after being exposed to tobacco smoke, are shown in Table 6. On the basis of the results, it was confirmed that the glass plate on which the abovementioned silica dent and projection film was formed has a repeating anti-fogging sustainability to some degrees with respect to tobacco smoke.

OILY SUBSTANCE WIPING TEST

Several drops of olive oil which is available on the market, were dropped onto a glass plate on which the abovementioned silica dent and projection film was formed, and coated on the surface by using a cloth of cotton. The glass plate was left at a room temperature for thirty minutes as it is. The glass plate was wiped by a cloth of cotton containing pure water several times. After being dried, the contact angle measurement and anti-fogging property evaluation were carried out by the abovementioned method. The results were shown in Table 6. On the basis of the results, it was confirmed that although oily substance slightly remains on the surface of the glass plate on which the silica dent and projection film was formed to cause the anti-fogging property to be lowered, the same has an anti-fogging sustainability to some degree.

ANT-FOGGING PROPERTY EVALUATION AFTER WATER RESISTANCE TEST AND INDOOR LEAVE-AS-IT-IS TEST

A glass plate on which the abovementioned silica dent and projection film was formed is caused to be erect vertically, pure water of 500 milliliter was sprayed on the entire surface of the glass plate for about three minutes to flow water on the entire surface thereof. After the glass plate was left indoors for thirty days as it was after the glass plate was dried, four-level evaluation shown in Table 2 was carried out in compliance with the method of measurement of contact angle and method for evaluation of the abovementioned anti-fogging property.

As shown in Table 8, on the glass plate on which the abovementioned silica dent and projection film was formed, although the anti-fogging property is somewhat lowered, the property was not bad. After the water resistance test and indoor leave-as-it-is test, it was confirmed that the anti-fogging property could be secured to some degree.

[Embodiment example 2]

FORMATION OF ORGANOSILANE COATED DENT AND PROJECTION SURFACE 0.1N acetic acid of 1 milliliter was added to ethanol (99.5%) of 1000 milliliters, which is available on the market, and they are blended to each other. [Methoxy (polyethyleneoxy) propyl] trimethoxysilane (SIM 6492.7 made by Chisso Co., Ltd., content 90%, molecular weight from 460 to 590, ethyleneoxide unit from 6 to 9) of 4 grams was added to a solution of 796 grams, the major constituent of which is ethanol, and mixed at 30° C. for one hour, whereby organosilane coating solution was prepared.

The glass plate, on which a silica dent and projection film was formed, prepared in embodiment example 1, was ultrasonically cleaned in pure water and dried. Thereafter, the glass plate was immersed in the abovementioned organosilane coating solution and lifted up at rate of 5 cm per minute, whereby the solution was coated on both the sides of the glass plate having a silica dent and projection film. After the glass plate was dried and heat-treated at 120° C. for thirty minutes, and cooled down to the room temperature, the same was lightly washed with pure water, whereby a glass plate having a silica dent and projection film was obtained, on which an organosilane layer about 8 nm thick, including polyethylene oxide group in its molecule was formed.

[Embodiment example 3]

FORMATION OF SURFACE DENTS AND PROJECTIONS

Tetraethoxy silane 31 parts by weight, which is available on the market, was added to 2-propanol 380 parts by weight, and 1 normality hydrochloric acid 1.6 parts by weight and water 6.5 parts by weight were added thereto. They were agitated at 50° C. for five hours and at 30° C. for one day to cause them to be hydrolyzed. Silica colloids having a grain size of 50 nm (Brand name: Snowtex OL, Nissan Chemical Industries, Ltd., solid content, 20 percents by weight) 30 parts by weight was added to the hydrolyzed solution, and they were further agitated at 30° C. for five hours. A solution equivalent to 180 parts by weight was partially taken from the obtained solution about 450 parts by weight, wherein ethanol 120 parts by weight was added thereto to adjust the solid content to 2%, thereby obtaining a coating liquid for forming dent and projections.

The abovementioned coating liquid for forming dents and projections was coated, by using a roller coater, onto soda lime silicate glass plate (300 mm×300 mm×5 mm) polished, washed, ultrasonically cleaned, and dried as in embodiment example 1. The coating was applied onto both the sides of the glass plate. The glass plate was dried at 150° C. for thirty minutes and was heated in an electric hearth until the plate temperature became 600° C. Thereafter, the same was immediately taken out and quenched by air blow, whereby obtaining a glass plate on which a silica dent and projection film 80 nm thick was formed.

[Embodiment example 4]

FORMATION OF ORGANOSILANE COATED DENT AND PROJECTION SURFACE 0.1N acetic acid 1 milliliter was added to 2-propanol 1000 milliliters, which is available on the market, and they were agitated. n-propyltrimethoxy silane 0.1 grams (LS-3120 made by Sinetsu Chemical Industries, Ltd) was added to the solution of 792 grams, and they were agitated at 30° C. for one hour, whereby organosilane coating liquid was prepared.

After the glass plate on which a silica dent and projection film was formed in embodiment example 3 was ultrasonically cleaned in pure water and dried, a glass plate provided with a silica dent and projection film was obtained, on which an organosilane layer about 0.5 nm thick, including an n-propyl group in its molecule, was obtained by the same method which is the same as that described in embodiment example 2.

[Embodiment example 5]

FORMATION OF SURFACE DENTS AND PROJECTIONS

Tetraethoxy silane 25 parts by weight, which is available on the market, was added to 2-propanol 380 parts by weight, and 1N nitric acid 1.6 parts by weight and water 6.5 parts by weight were added thereto, wherein after they were agitated at 50° C. for three hours and at 30° C. for one day, they were hydrolyzed. Titania colloids 23 parts by weight (Brand name: Titania sol CS-N, made by Ishihara Industries, CO., Ltd., solid content 30 percents by weight) having a grain size from 30 through 60 nm was added to the hydrolyzed solution, trimethylmethoxysilane 1 weight part was added as a dispersion assisting agent, and was further agitated at 30° C. for five hours. A solution equivalent to 100 parts by weight was partially taken out from the obtained solution of about 437 parts by weight. Ethanol 544 parts by weight was added thereto to adjust its solid content to 0.5%, thereby obtaining a coating liquid for forming dents and projections.

Soda lime silicate glass (60 mm×150 mm×3 nm) polished, washed, ultrasonically cleaned and dried as in embodiment example was vertically hung in an environment, the temperature and relative humidity (RH) of which are 20° C. and 30%, and the abovementioned coating liquid for forming dents and projections was caused to flow from the top end thereof to coat the glass therewith (Flow coating method). The coating was applied to both the sides of the glass plate. The glass plate was dried at 150° C. for thirty minutes and heat-treated in an oven, the temperature of which is 500° C., for three hours, thereby obtaining a glass plate 100 nm thick, on which a silica-titania dent and projection film was formed.

[Embodiment example 6]

MAKING OF ORGANOSILANE-COATED DENT AND PROJECTION SURFACE

Phenyl trichlorosilane 1 weight part (TSL8063 made by Toshiba Silicone Limited) was dissolved in n-hexane 1000 parts by weight to obtain an organosilane coating liquid. After the glass plate, on which a silica-titania dent and projection film was formed, prepared in embodiment example 5 was irradiated to ultraviolet rays in an atmosphere of oxygen and had its surface cleaned, the glass plate was immersed in the organosilane coating liquid and kept at 40° C. for five hours. Thereafter, the glass plate was taken out and was washed with n-hexane, whereby a glass plate provided with a silica-titania dent and projection film was obtained, on which an organosilane mono molecular layer (about 5 nm thick) having a phenyl group in its molecule on the surface thereof is formed.

[Embodiment example 7]

FORMATION OF SURFACE DENTS AND PROJECTIONS

Zirconium butoxido 5 parts by weight was added to ethyl acetoacetate 1 weight part and agitated at 30° C. for two hours (Solution "A"). Separately, tetraethoxy silane 15 weights parts, 2-propanol 170 parts by weight, 1 normality nitric acid 0.8 parts by weight, and water 3.5 parts by weight were added to each other, and they were agitated at 30° C. for two hours (Solution "B"). Solutions "A" and "B" were blended, to which chain silica colloids (Brand name: Snowtex OUP, Nissan Chemical Industries, Ltd., solid content: 15 percents by weight) 15 parts by weight having a diameter from 10 to 20 nm and a length from 40 to 300 nm was added, wherein they were agitated at 50° C. for three hours and further agitated at 30° C. for one day to hydrolyze them. A solution equivalent to 40 parts by weight was partially taken out from the obtained liquid 210 parts by weight, to which ethanol 480 parts by weight was added in order to adjust the solid content to 0.3%, thereby obtaining a coating liquid for forming dents and projections.

The abovementioned coating liquid for forming dents and projections was coated, by a method descried in embodiment example 5, on a soda lime silicate glass plate (60 mm×150 mm×3 mm) polished, washed, ultrasonically cleaned and dried as in embodiment example 1. The glass plate was dried at 120° C. for one hour and heat-treated in an oven, the temperature of which is 500° C., for two hours, thereby obtaining a glass plate on which a silica-zirconia dent and projection film 50 nm thick was formed.

[Embodiment example 8]

MAKING OF ORGANOSILANE-COATED DENT AND PROJECTION SURFACE

After the glass plate, on which a silica-zirconia dent and projection film was formed, prepared in embodiment example 7, was irradiated with ultraviolet rays in an atmosphere of oxygen and had its surface cleaned, the glass plate was placed in a vacuum chamber with its pressure reduced to about 5 Torr, wherein the system was closed and heated to 80° C. Next, ethyltrichlorosilane of 0.005 milliliters (SIE4901.0 made by Chisso Co., Ltd.) was introduced into the chamber by using an injector and was evaporated therein. After they were reacted with each other for one hour, the surplus organosilane in the chamber was eliminated through a gold trap by vacuumizing. By the abovementioned operations, a glass plate provided with a silica-zirconia dent and projection film was obtained, on which an organosilane mono-molecular layer (about 0.3 nm thick) including an ethyl group in its molecule is formed.

[Embodiment example 9]

After a glass plate, on which a silica dent and projection film is formed, prepared in embodiment example 1, was ultrasonically cleaned in pure water and dried, the glass plate was immersed in a water solution containing polyoxy ethylene nonylphenyl ether (Nippon Yushi Co., Ltd. "Nonion NS-220", non-ionized, HLB value 16.0) at a ratio of 0.2%, and was lifted up at a rate of 30 cm per minute, whereby the solution was coated onto the glass plate provided with a silica dent and projection film and the plate was sufficiently dried at a room temperature. After being dried, the surface thereof was rubbed by using a cloth of cotton to eliminate the surplus surface-active agent, thereby obtaining a surface-active agent layer about 30 nm thick.

[Embodiment example 10]

A water solution including di-2-ethylhexyl sodium sulfosuccinate (Nippon Yushi Co., Ltd., "Rapisol B-30", non-ionized) at a ratio of 0.05% was coated onto the glass plate provided with a silica dent and projection film, prepared in embodiment example 2 by a flow-coating method, and the glass plate was sufficiently dried at a room temperature. After being dried, the surface thereof was rubbed by using a cloth of cotton to eliminate the surplus surface-active agent, thereby obtaining a surface-active agent layer about 10 nm thick.

[Embodiment example 11]

A glass plate provided with a silica dent and projection film, on which organosilane prepared in embodiment example 4 was coated, was immersed in an ethanol solution containing polyoxyethylene stearil ether (Nippon Yushi Co., Ltd. "Nonion S-207", non-ionized, HLB value 10.7) at a ratio of 2% and was lifted up at a rate of 5 cm per minute, whereby the liquid was coated onto the glass plate provided with a dent and projection film, and the glass plate was dried at a room temperature. A surface-active agent layer about 80 nm thick was obtained.

[Embodiment example 12]

After a glass plate provided with a silica-zirconia dent and projection film, prepared in embodiment example 7, was ultrasonically cleaned in pure water and dried, the same was immersed in a water solution containing polyoxy ethylene nonyl phenyl ether (Nippon Yushi Co., Ltd. "Nonion NS-202", non-ionized, HLB value 5.7) at a ratio of 0.2% and was lifted up at a rate of 30 cm per minute. Thereby, the liquid was coated onto the glass plate having a silica dent and projection film and was sufficiently dried at a room temperature. After being dried, the surface thereof was rubbed by using a cloth of cotton to eliminate the surplus surface-active agent, whereby a surface-active agent layer about 30 nm thick was formed.

[Embodiment example 13]

Several drops of a suspension containing sorbitan monolaurate (Nippon Yushi CO., Ltd., "Nonion LP-20R", non-ionized, HLB value 8.6) at a ratio of 1% were dropped onto an organosilane-coated glass plate having a silica-zirconia dent and projection film, prepared in embodiment example 8, and after the suspension was coated on the surface thereof by using a cloth of cotton, the glass plate was dried. Thus, a surface-active agent layer about 50 nm thick was formed.

[Embodiment example 14]

Several drops of a water solution containing sodium dodecyl benzene sulfonate (Nippon Yushi Co., Ltd. "New Rex Powder F", negative-ionized) at a ratio of 2% were dropped onto a glass plate having a silica dent and projection filn made in embodiment example 1 and were coated onto the surface thereof by using a cloth of cotton. Then, the same was dried. A surface-active agent layer about 70nm thick was formed.

In compliance with the method described in embodiment example 1, anti-fogging articles obtained according to embodiment examples 2 to 14 were subjected to surface roughness measurement, contact angle measurement, initial and repeating anti-fogging property evaluation, tobacco smoke test, oily substance wiping test, and anti-fogging property evaluation after water resistance and leave-as-it-is tests. The results thereof are shown in Tables 4, 6 and 8. As shown in these tables, the anti-fogging articles showed an excellent anti-fogging property in either case. The anti-fogging articles according to embodiment examples 3, 5 and 7 show some anti-fogging sustainability, and furthermore the articles according embodiment examples 2, 4, 6, and 8 through 14, which are coated with the abovementioned organosilane layer or surface-active agent layer on the surface thereof, has a good anti-fogging sustainability, wherein in embodiment examples 2, 4, 6 and 8, the articles did not adsorb any stain. Furthermore, figures in brackets in the columns of surface roughness Ra and Sm in Tables are the measured values with respect to the surface of surface-active agent layer, wherein horizontal lines (–) means that no measurement was carried out (These are applicable in the following comparison controls).

[Comparison example 1]

By using as a matrix a soda line silicate glass plate (60 mm×150 mm×3 mm), the surface of which was modified by surface polishing with a ceric oxide oriented polishing agent, washing, ultrasonic cleaning in pure water, drying and thereafter irradiating with ultraviolet rays in an atmosphere of oxygen, the contact angle measurement, anti-fogging property evaluation, tobacco smoke exposure test, oily substance wiping test, and anti-fogging property evaluation after water resistance and leave-as-it-is tests were carried out with respect to water drops of 0.4 mg in compliance with the method described in embodiment example 1. These results are shown in Tables 5, 7 and 9. Judging from the results, although it can be recognized that non-treated glass having smooth surface has an anti-fogging property to some degree on the initial state just after the glass is washed well, it is confirmed that the anti-fogging property is easily lost due to stains adsorbed or adhered thereto.

[Comparison example 2]

A glass plate having smooth surface, on which an organosilane layer including a polyethylene oxido group in its molecule was formed, was obtained in compliance with the same conditions as those in embodiment example 2, except using as a matrix a soda line silicate glass plate (60 mm×150 mm×3 mm, not having any dent and projection film) surface-polished with a ceric oxide oriented polishing agent, washed, ultrasonic cleaned in pure water, dried and thereafter irradiated with ultraviolet rays in an atmosphere of oxygen. Furthermore, contact angle measurement, initial and repeating anti-fogging property evaluation, tobacco smoke test, oily substance wiping test, and anti-fogging property evaluation after water resistance and leave-as-it-is tests were carried out with respect to 0.4 mg water drops in compliance with the method described in embodiment example 1. These results are shown in Tables 5, 7, and 9. Judging from the results, as for glass, of smooth surface, on which an organosilane layer including a polyethylene oxido group in its molecule was formed, it was found that the anti-fogging property does not reach a satisfactory level while a slight anti-fogging property was recognized.

[Comparison control 3]

A soda line silicate glass plate (60 mm×150 mm×3 mm, not having any dent and projection film) surface-polished with a ceric oxide oriented polishing agent, washed, ultrasonically cleaned in pure water, dried and thereafter irradiated with ultraviolet rays in an atmosphere of oxygen was immersed in a water solution containing hydroflouric acid at a ratio of 0.28 mol per liter at 25° C. for 120 seconds, washed with a great deal of water, and dried at 100° C., whereby a glass plate, the surface of which was etched as above, was obtained.

The surface roughness measurement, contact angle measurement, initial and repeating anti-fogging property evaluation, tobacco smoke test, oily substance wiping test, and anti-fogging property evaluation after water resistance and leave-as-it-is tests were carried out with respect to the glass plate having its surface etched, in compliance with the method described embodiment example 1. These results are shown in Tables 5, 7 and 9. Judging from the results, although it can be recognized that the glass plate having its surface etched has an anti-fogging property to some degree on the initial state just after the glass is washed well, it is confirmed that the anti-fogging property is easily lost due to stains adsorbed or adhered thereto.

[Comparison example 4]

A surface-active agent described in embodiment example 9 was coated onto a glass substrate described in comparison example 1 by the method described in embodiment example 9, and a surface-active agent layer about 30nm was formed.

With respect to the glass plate having a surface-active agent layer coated, the surface roughness measurement, contact angle measurement, initial and repeating anti-fogging property evaluation, tobacco smoke test, oily substance wiping test, and fogging -preventing property evaluation after water resistance and leave-as-it-is tests were carried out in compliance with the method described embodiment example 1. These results are shown in Tables 5, 7 and 9. Judging from the results, although the glass plate having a surface-active agent layer coated shows an excellent anti-fogging property in the initial state, it is found that the anti-fogging sustainability with respect to stains is not good and the repeating anti-fogging sustainability is low.

[Embodiment example 15]

FORMATION OF SURFACE DENTS AND PROJECTIONS

Chain silica colloids having a diameter from 10 to 20 nm and a length from 40 to 300 nm (Brand name: Snowtex OUP, Nissan Chemical Industries, Ltd., solid content 15 percents by weight) 2.3 parts by weight and 2-propanol 196.9 parts by weight were blended at a room temperature for five minutes, and silicon tetrachloride 0.9 parts by weight, which is available on the market, was added to the above and was agitated at a room temperature for one hour. Thereby, a coating liquid for forming dents and projections was obtained.

The above coating liquid for forming dents and projections was coated onto a soda lime silicate glass plate (65 mm×150 mm×3 mm) polished, washed, ultrasonically cleaned, and dried as in embodiment example 1 in compliance with the method described in embodiment example 5. Thereafter, the glass plate was only dried at a room temperature without any special heat treatment. Thereby, a glass plate on which a silica dent and projection film 60 nm thick is formed was obtained.

[Embodiment example 16]

FORMATION OF SILICA DENT AND PROJECTION FILM TO WHICH NEGATIVE-IONIZED SURFACE-ACTIVE AGENT IS ADDED

Chain silica colloids having a diameter from 10 to 20 nm and a length from 40 to 300 nm (Brand name: Snowtex OUP, Nissan Chemical Industries, Ltd., solid content 15 percents by weight) 2.3 parts by weight and 2-propanol 195.2 parts by weight were blended at a room temperature for five minutes. Silicon tetrachloride 0.9 parts by weight, which is available on the market, and an ethanol solution 1.7 parts by weight containing at a ratio of 10% a negative-ionized surface-active agent (Brand name: Rapisol A-30, Nippon Yushi Co., Ltd., solid content, 30 percents by weight) mainly composed of sodium dioctyl sulfosuccinate were added to the above, wherein they were agitated at a room temperature for one hour. Thereby, a coating liquid for forming dents and projections was obtained.

After the surface of polyethylene terephthalate film (100 μm thick) was treated by corona discharge under the conditions of normal temperature, normal atmospheric pressure, and charge density of 200 W/m² in the atmosphere, the abovementioned coating liquid for forming dents and projections was coated onto the film by the method described in embodiment example 5. Thereafter, the film was only dried at a room temperature without any special heat treatment. Thereby, polyethylene terephthalate film was obtained, on which a negative-ionized surface-active agent added silica dent and projection film 60nm thick was formed.

[Embodiment example 17]

FORMATION OF PHOSPHATE COMPOUND ADDED SILICA DENT AND PROJECTION FILM

Chain silica colloids having a diameter from 10 to 20 nm and a length from 40 to 300 nm (Brand name: Snowtex OUP, Nissan Chemical Industries, Ltd., solid content 15 percents by weight) 4.6 parts by weight and 2-propanol 177.2 parts by weight were blended at a room temperature for five minutes. Silicon tetrachloride 1.8 parts by weight, which is available on the market, and an ethanol solution 16.4 parts by weight containing triethyl phosphate at a ratio of 1% were added to the above, wherein they were agitated at a room temperature for three hour. Thereby, a coating liquid for forming dents and projections was obtained.

A coating liquid for forming dents and projections was coated onto soda lime silicate glass plate (65 mm×150 mm×3 mm) polished, washed, ultrasonically cleaned, and dried as in embodiment example 1 in compliance with the method described in embodiment example 5. Thereafter, they were dried at 120° C. for five minutes. Therefore, a glass plate was obtained, on which a phosphate compound added silica dent and projection film 120 nm thick was formed.

[Embodiment example 18]

FORMATION OF SILICA DENT AND PROJECTION FILM TO WHICH NEGATIVE-IONIZED SURFACE-ACTIVE AGENT AND PHOSPHATE COMPOUND ARE ADDED

Chain silica colloids having a diameter from 10 to 20 nm and a length from 40 to 300 nm (Brand name: Snowtex OUP, Nissan Chemical Industries, Ltd., solid content 15 percents by weight) 3.1 parts by weight and 2-propanol 184.3 parts by weight were blended at a room temperature for five minutes. Tetraethoxysilane 1.5 parts by weight, which is available on the market, and conc. hydrochloric acid (35%) 1.3 parts by weight were added thereto and they were blended at a room temperature for five minutes. An ethanol solution 7.5 parts by weight containing at a ratio of 1% a negative-ionized surface-active agent (Brand name: Rapisol A-30, Nippon Yushi Co., Ltd., solid content, 30 percents by weight) mainly composed of sodium dioctyl sulfosuccinate and an ethanol solution 2.7 parts by weight containing triethyl phosphate at a ratio 1% were added to the above, wherein they were agitated at a room temperature for two hour. Thereby, a coating liquid for forming dents and projections was obtained.

The abovementioned coating liquid for forming dents and projections was coated, by the method described in embodiment example 5, onto a soda lime silicate glass plate (65 mm×150 mm×3 mm) polished, washed, ultrasonically cleaned, and dried as in embodiment example 1. Thereafter, they were dried at 120° C. for five minutes. Thereby, a glass plate provided with a silica dent and projection film 120 nm thick, on which a negative-ionized surface-active agent and phosphate compound were added, was obtained.

[Embodiment example 19]

FORMATION OF PHOSPHATE COMPOUND ADDED SILICA DENT AND PROJECTION FILM

Chain silica colloids having a diameter from 10 to 20 nm and a length from 40 to 300 nm (Brand name: Snowtex OUP, Nissan Chemical Industries, Ltd., solid content 15 percents by weight) 2.6 parts by weight and 2-propanol 194.1 parts by weight were blended at a room temperature for five minutes. Tetraethoxysilane 1.3 parts by weight and 1N hydrochloric acid 1.2 parts by weight, which are available on the market, were added thereto and further blended at a room temperature for five minutes. Furthermore, an ethanol solution 0.8 parts by weight containing triethyl phosphite at a ratio of 1 percent was added thereto, and they were blended at a room temperature for four hours. Then, a coating liquid for forming dents and projections was obtained.

The abovementioned coating, liquid for forming dents and projections was coated, by the method described in embodiment example 5, onto a soda lime silicate glass plate (65 mm×150 nm×3 mm) polished, washed, ultrasonically cleaned, and dried as in embodiment example 1. Thereafter, they were dried at 120° C. for thirty minutes, and heat-treated at 500° C. for two hours. Thereby, a glass plate 100 nm thick, on which a phosphate compound added silica dent and projection film was formed, was obtained.

[Embodiment example 20]

FORMATION OF SURFACE DENTS AND PROJECTIONS

Chain silica colloids having a diameter from 10 to 20 nm and a length from 40 to 300 nm (Brand name: Snowtex OUP, Nissan Chemical Industries, Ltd., solid content 15 percents by weight) 1.2 parts by weight, spherical silica colloids having a diameter from 10 to 20 nm (Brand name: Snowtex 0, Nissan Chemical Industries, Ltd., solid content 20 percents by weight) 0.8 parts by weight, ethanol 198.6 parts by weight, and 2-propanol 198.6 parts by weight were blended at a room temperature for five minutes. Silicon tetrachloride 0.9 parts by weight, which is available on the market, was added thereto, agitated at a room temperature for one hour, and a coating liquid for forming dents and projections was obtained.

After the surface of polyethylene terephthalate film (100 μm thick) was treated by corona discharge under the conditions of normal temperature, normal atmospheric pressure, and charge density of 200 W/m² in the atmosphere, the abovementioned coating liquid for forming dents and projections was coated onto the film by the method described in embodiment example 5. Thereafter, the film was only dried at a room temperature without any special heat treatment. Thereby, polyethylene terephthalate film was obtained, on which a silica dent and projection film 30 nm thick was formed.

[Embodiment example 21]
FORMATION OF TITANIA-SILICA DENT AND PROJECTION FILM

Chain silica colloids having a diameter from 10 to 20 nm and a length from 40 to 300 nm (Brand name: Snowtex OUP, Nissan Chemical Industries, Ltd., solid content 15 percents by weight) 2.3 parts by weight, ethanol 194.1 parts by weight, acethyl acetone 1.1 parts by weight, titanium isopropoxido 1.3 parts by weight, 6N hydrochloric acid 0.3 parts by weight were blended at a room temperature for three hours. Thereby, a coating liquid for forming dents and projection was obtained.

The abovementioned coating liquid for forming dents and projections was coated, by the method described in embodiment example 5, onto a soda lime silicate glass plate (65 mm×150 mm×3 mm) polished, washed, ultrasonically cleaned, and dried as in embodiment example 1. Thereafter, they were dried at 120° C. for thirty minutes, and heat-treated at 400° C. for two hours. Thereby, a glass plate 60nm thick, on which a titania-silica dent and projection film was formed, was obtained.

Surface roughness measurement, contact angle measurement, initial and repeating anti-fogging property evaluation, tobacco smoke test, oily substance wiping test, and anti-fogging property evaluation after water resistance and leave-as-it-is tests were carried out with respect to the titania-silica dent and projection film added glass plate in compliance with the method described in embodiment example 1. These results are shown in Tables 5, 7 and 9. Judging from the results, it was found that the titania-silica dent and projection film added glass plate has an excellent anti-fogging property and has an anti-fogging sustainability to some degree.

Light of ultraviolet ray lamp was irradiated, for eight hours, onto the glass plate after the tobacco smoke test, so that the ultraviolet ray strength on the surface becomes 2 mW/cm². The contact angle to water drops of 0.4 mg is 1 deg, and the fogging evaluation is "⊚" and the penetration distortion evaluation also becomes "⊚", wherein a good anti-fogging property was secured again, that is, it was confirmed that the article has a self-cleaning property.

[Embodiment example 22]
FORMATION OF TITANIA-SILICA DENT AND PROJECTION FILM

Solution in which titanium oxide fine particles having a diameter about 10 nm (Brand name: ST-K01, Ishihara Industries Co., Ltd., solid content, 10 percents by weight, content of titanium oxide, 8 percents by weight) 2.7 parts by weight is dispersed, ethanol 195.3 parts by weight, chain silica colloids (Brand name: Snowtex OUP, Nissan Chemical Industries, Ltd., solid content 15 percents by weight) 1.4 parts by weight, silicon tetrachloride 0.6 parts by weight, which is available on the market, were agitated at a room temperature for one hour. Thereby, a coating liquid for forming dents and projections was obtained.

The abovementioned coating liquid for forming dents and projections was coated, by the method described embodiment example 5, onto soda lime silicate glass plate (65 mm×150 mm×3 mm) polished, washed, ultrasonically cleaned, and dried as in embodiment example 1. Thereafter, the glass plate was only dried at a room temperature and no special heat treatment was given thereto. Thereby, a glass plate on which a titania-silica dent and projection film 60nm thick was formed was obtained.

Surface roughness measurement, contact angle measurement, initial and repeating anti-fogging property evaluation, tobacco smoke test, oily substance wiping test, and anti-fogging property evaluation after water resistance and leave-as-it-is tests were carried out with respect to the titania-silica dent and projection film added glass plate in compliance with the method described in embodiment example 1. These results are shown in Tables 5, 7 and 9. Judging from the results, it was found that the titania-silica dent and projection film added glass plate has an excellent anti-fogging property and has an anti-fogging sustainability to some degree.

Light of ultraviolet ray lamp was irradiated, for eight hours, onto the glass plate after the tobacco smoke test, so that the ultraviolet ray strength on the surface becomes 2 mW/cm². The contact angle to water drops of 0.4 mg is 1 deg, and the fogging evaluation is "⊚", and the penetration distortion evaluation also becomes "⊚", wherein a good anti-fogging property was secured again, that is, it was confirmed that the article has a self-cleaning property.

[Embodiment example 23]
Ethanol solution containing polyoxy ethylene nonyl phenyl ether (Nippon Yushi Co., Ltd, "Nonion NS-220" non-ionized, HLB value 16.0) at a ratio of 0.1% was coated by a flow coating method, onto polyethylene terephthalate film on which the negative-ionized surface-active agent added silica dent and projection film prepared in embodiment example 16 was formed, and the same is sufficiently dried at a room temperature, and a surface-active agent layer about 80nm thick was formed.

[Embodiment example 24]
Organosilane coating liquid prepared in embodiment example 2 was coated, by the method described in embodiment example 2, onto a glass plate on which a phosphate compound added silica dent and projection film prepared in embodiment example 17 was formed. Furthermore, the same was heat-treated and post-treated by the method described in embodiment example 2, and a glass plate provided with a phosphate compound added silica dent and projection film, was obtained, on which an organosilane layer about 8 nm thick and containing polyethylene oxido group in its molecule was formed.

[Embodiment example 25]
A negative-ionized surface-active agent layer about 70 nm thick was formed, by the method described in embodiment example 14, on a glass plate on which a silica dent and projection film, to which negative-ionized surface-active agent prepared in embodiment example 18 and phosphate compound were added, was formed.

[Embodiment example 26]
FORMATION OF SILICA DENT AND PROJECTION FILM

Chain silica colloids having a diameter from 10 to 20 nm and a length from 40 to 300 nm (Brand name: Snowtex OUP, Nissan Chemical Industries, Ltd., solid content, 15 percents by weight) 2.3 parts by weight, 2-propanol 194.6 parts by weight, tetraethoxysilane 1.1 parts by weight, 35% hydrochloric acid 4.2 parts by weight were blended at a room temperature for thirty minutes. Thereby, a coating liquid for forming dents and projections was obtained. The solid content converted to silicon due to tetraethoxy silane is 0.15 percents by weight, acid concentration is about 1.6 mol per liter, and the water content is about 2.33 percents by weight.

The abovementioned coating liquid for forming dents and projections was coated, by the method described embodiment example 5, onto a soda lime silicate glass plate (65 mm×150 mm×3 mm) polished, washed, ultrasonically cleaned, and dried as in embodiment example 1. Thereafter, the glass plate was only dried at a room temperature for two minutes and no special heat treatment was given thereto. Thereby, a glass plate on which a silica dent and projection film 60 nm thick was formed was obtained.

Dry cloth was pressed to the abovementioned dent and projection film surface, the same was strongly rubbed, and a state where damages occurred on the dent and projection film surface was observed. It was found that almost no damage occurred.

Furthermore, for comparison, in formation of the abovementioned silica dent and projection film, a coating liquid was prepared under the same conditions and by the same method as those in embodiment example 26, excepting that 1% hydrochloric acid 0.8 parts by weight was used instead of 35% hydrochloric acid 4.2 parts by weight. The solid content converted to silicon due to tetraethoxy silane is 0.15 percents by weight, acid concentration is about about 0.0009 mol per liter, and the water content is about 1.36 percents by weight.

The abovementioned coating liquid for forming dents and projections was coated onto a soda lime silicate glass plate (65 mm×150 mm×3 mm) by the same method and under the same conditions as those in embodiment example 26. Thereby, a glass plate was obtained, on which a silica dent and projection film 70 nm thick was formed.

By the same method and under the same conditions as those in embodiment example 26, dry cloth was pressed to the abovementioned dent and projection film surface, the same was strongly rubbed, and a state where damages occurred on the dent and projection film surface was observed. It was found that damages occurred.

Surface roughness measurement, contact angle measurement, initial and repeating anti-fogging property evaluation, tobacco smoke test, oily substance wiping test, and anti-fogging property evaluation after water resistance and leave-as-it-is tests were carried out by the method described in embodiment example 1, with respect to anti-fogging articles obtained according to the abovementioned embodiment examples from 15 to 20 and from 23 to 26. These results show excellent anti-fogging performance as shown Tables 5, 7 and 9. In embodiment examples 15, 19, 20 and 26, they showed anti-fogging sustainability to some degree, and in embodiment examples 17 and 24, they showed good anti-fogging sustainability, and stains were hardly adsorbed. Furthermore, in embodiment examples 16, 18, 23, and 25, they showed excellent anti-fogging sustainability, and stains were hardly adsorbed.

TABLE 4

| Sample | Surface roughness (nm) | | Initial state | | | Repeating anti-fogging property | |
|---|---|---|---|---|---|---|---|
| | Ra | Sm | Contact angle (deg.) | Fogging evaluation | Distortion evaluation | Fogging evaluation | Distortion evaluation |
| Embodiment example 1 | 7 | 20 | 3 | ⊚ | ⊚ | 3 | 4 |
| Embodiment example 2 | 8 | 22 | 3 | ⊚ | ⊚ | 4 | 4 |
| Embodiment example 3 | 15 | 80 | 3 | ⊚ | ⊚ | 3 | 3 |
| Embodiment example 4 | 15 | 80 | 5 | ⊚ | ⊚ | 4 | 3 |
| Embodiment example 5 | 25 | 98 | 4 | ⊚ | ⊚ | 3 | 4 |
| Embodiment example 6 | 24 | 98 | 6 | ⊚ | ⊚ | 4 | 4 |
| Embodiment example 7 | 8 | 19 | 2 | ⊚ | ⊚ | 3 | 4 |
| Embodiment example 8 | 8 | 19 | 3 | ⊚ | ⊚ | 4 | 3 |
| Embodiment example 9 | 7 (2.3) | 20 (38) | 1 | ⊚ | ⊚ | 5 | 5 |
| Embodiment example 10 | 8 (5.8) | 22 (28) | 1 | ⊚ | ⊚ | 5 | 5 |
| Embodiment example 11 | 15 (0.3) | 80 (—) | 1 | ⊚ | ⊚ | 5 | 5 |
| Embodiment example 12 | 8 (2.0) | 19 (23) | 2 | ⊚ | ⊚ | 5 | 4 |
| Embodiment example 13 | 8 (1.5) | 19 (21) | 2 | ⊚ | ⊚ | 5 | 5 |
| Embodiment example 14 | 7 (0.8) | 20 (—) | 1 | ⊚ | ⊚ | 5 | 5 |

TABLE 5

| Sample | Surface roughness (nm) | | Initial state | | | Repeating anti-fogging property | |
|---|---|---|---|---|---|---|---|
| | Ra | Sm | Contact angle (deg.) | Fogging evaluation | Distortion evaluation | Fogging evaluation | Distortion evaluation |
| Embodiment example 15 | 7 | 22 | 2 | ⊚ | ⊚ | 3 | 4 |
| Embodiment example 16 | 6 | 21 | 1 | ⊚ | ⊚ | 5 | 5 |
| Embodiment example 17 | 7 | 21 | 2 | ⊚ | ⊚ | 5 | 5 |
| Embodiment example 18 | 6 | 20 | 1 | ⊚ | ⊚ | 5 | 5 |
| Embodiment example 19 | 5 | 22 | 2 | ⊚ | ⊚ | 5 | 5 |

TABLE 5-continued

| Sample | Surface roughness (nm) Ra | Sm | Initial state Contact angle (deg.) | Fogging evaluation | Distortion evaluation | Repeating anti-fogging property Fogging evaluation | Distortion evaluation |
|---|---|---|---|---|---|---|---|
| Embodiment example 20 | 4 | 19 | 2 | ◎ | ◎ | 5 | 4 |
| Embodiment example 21 | 6 | 21 | 3 | ◎ | ◎ | 5 | 5 |
| Embodiment example 22 | 8 | 23 | 2 | ◎ | ◎ | 5 | 5 |
| Embodiment example 23 | 1.6 | not measured | 1 | ◎ | ◎ | 5 | 5 |
| Embodiment example 24 | 7 | 21 | 2 | ◎ | ◎ | 4 | 4 |
| Embodiment example 25 | 1.5 | not measured | 1 | ◎ | ◎ | 5 | 5 |
| Embodiment example 26 | 4 | 19 | 2 | ◎ | ◎ | 5 | 4 |
| Comparison example 1 | 0.1 or less | not measured | 8 | ○ | ○ | 1 | 0 |
| Comparison example 2 | 0.1 or less | not measured | 38 | Δ | Δ | 0 | not measured |
| Comparison example 3 | 2 | 20000 | 7 | ○ | ○ | 1 | 1 |
| Comparison example 4 | 0.1 or less (0.1 or less) | not measured (not measured) | 2 | ◎ | ◎ | 2 | 1 |

TABLE 6

| Sample | After tobacco smoke test Contact angle (deg.) | Fogging evaluation | Distortion evaluation | After oily substance wiping test Contact angle (deg.) | Fogging evaluation | Distortion evaluation |
|---|---|---|---|---|---|---|
| Embodiment example 1 | 10 | ◎ | ○ | 18 | ○ | Δ |
| Embodiment example 2 | 5 | ◎ | ◎ | 8 | ◎ | ◎ |
| Embodiment example 3 | 12 | ○ | ○ | 20 | ○ | Δ |
| Embodiment example 4 | 6 | ◎ | ◎ | 9 | ◎ | ◎ |
| Embodiment example 5 | 9 | ○ | ○ | 16 | ○ | Δ |
| Embodiment example 6 | 6 | ◎ | ◎ | 10 | ◎ | ○ |
| Embodiment example 7 | 10 | ◎ | ○ | 19 | ○ | Δ |
| Embodiment example 8 | 7 | ◎ | ◎ | 8 | ◎ | ◎ |
| Embodiment example 9 | 2 | ◎ | ◎ | 5 | ◎ | ○ |
| Embodiment example 10 | 2 | ◎ | ◎ | 3 | ◎ | ◎ |
| Embodiment example 11 | 1 | ◎ | ◎ | 3 | ◎ | ◎ |
| Embodiment example 12 | 2 | ◎ | ○ | 4 | ◎ | ○ |
| Embodiment example 13 | 2 | ◎ | ○ | 4 | ◎ | ◎ |
| Embodiment example 14 | 2 | ◎ | ◎ | 4 | ◎ | ○ |

TABLE 7

| Sample | After tobacco smoke test Contact angle (deg.) | Fogging evaluation | Distortion evaluation | After oily substance wiping test Contact angle (deg.) | Fogging evaluation | Distortion evaluation |
|---|---|---|---|---|---|---|
| Embodiment example 15 | 11 | ◎ | ○ | 17 | ○ | Δ |
| Embodiment example 16 | 3 | ◎ | ◎ | 2 | ◎ | ◎ |
| Embodiment example 17 | 5 | ◎ | ◎ | 4 | ○ | ◎ |
| Embodiment example 18 | 3 | ◎ | ◎ | 3 | ◎ | ◎ |
| Embodiment example 19 | 8 | ○ | ○ | 11 | ○ | ○ |
| Embodiment example 20 | 13 | ○ | ○ | 10 | ○ | Δ |
| Embodiment example 21 | 17 | Δ | ○ | 19 | ○ | Δ |
| Embodiment example 22 | 15 | ○ | Δ | 18 | ○ | Δ |
| Embodiment example 23 | 2 | ◎ | ◎ | 5 | ◎ | ◎ |
| Embodiment example 24 | 5 | ◎ | ◎ | 7 | ◎ | ○ |
| Embodiment example 25 | 1 | ◎ | ◎ | 3 | ◎ | ◎ |
| Embodiment example 26 | 12 | ○ | ○ | 10 | ○ | Δ |
| Comparison example 1 | 27 | X | Δ | 40 | X | X |
| Comparison example 2 | 39 | Δ | Δ | 40 | Δ | Δ |

TABLE 7-continued

| | After tobacco smoke test | | | After oily substance wiping test | | |
|---|---|---|---|---|---|---|
| Sample | Contact angle (deg.) | Fogging evaluation | Distortion evaluation | Contact angle (deg.) | Fogging evaluation | Distortion evaluation |
| Comparison example 3 | 23 | X | Δ | 42 | X | X |
| Comparison example 4 | 5 | ○ | Δ | 20 | Δ | Δ |

TABLE 8

| | After water resistance test and indoor leave-as-it-is test | | |
|---|---|---|---|
| Sample | Contact angle (deg.) | Fogging evaluation | Distortion evaluation |
| Embodiment example 1 | 8 | ○ | Δ |
| Embodiment example 2 | 3 | ◎ | ○ |
| Embodiment example 3 | 10 | ○ | Δ |
| Embodiment example 4 | 5 | ◎ | ○ |
| Embodiment example 5 | 9 | Δ | ○ |
| Embodiment example 6 | 6 | ○ | ○ |
| Embodiment example 7 | 11 | ○ | Δ |
| Embodiment example 8 | 5 | ○ | ○ |
| Embodiment example 9 | 4 | ◎ | ○ |
| Embodiment example 10 | 3 | ◎ | ○ |
| Embodiment example 11 | 3 | ◎ | ○ |
| Embodiment example 12 | 7 | ○ | ○ |
| Embodiment example 13 | 3 | ◎ | ○ |
| Embodiment example 14 | 4 | ◎ | ○ |

TABLE 9

| | After water resistance test and indoor leave-as-it-is test | | |
|---|---|---|---|
| Sample | Contact angle (deg.) | Fogging evaluation | Distortion evaluation |
| Embodiment example 15 | 8 | ○ | Δ |
| Embodiment example 16 | 3 | ◎ | ◎ |
| Embodiment example 17 | 5 | ◎ | ◎ |
| Embodiment example 18 | 3 | ◎ | ◎ |
| Embodiment example 19 | 7 | ○ | ○ |
| Embodiment example 20 | 11 | ○ | Δ |
| Embodiment example 21 | 16 | ○ | Δ |
| Embodiment example 22 | 14 | ○ | Δ |
| Embodiment example 23 | 2 | ◎ | ◎ |
| Embodiment example 24 | 2 | ◎ | ◎ |
| Embodiment example 25 | 1 | ◎ | ◎ |
| Embodiment example 26 | 12 | ○ | Δ |
| Comparison example 1 | 45 | X | X |
| Comparison example 2 | 38 | Δ | X |
| Comparison example 3 | 33 | X | X |
| Comparison example 4 | 46 | X | X |

According to the invention, it is possible to obtain anti-fogging glass which has an excellent anti-fogging property and anti-fogging sustainability. Since the anti-fogging glass is covered with a film mainly composed of inorganic materials, the durability and wear resistance are also excellent.

INDUSTRIAL FEASIBILITY

The invention can be utilized as an anti-fogging article in which an anti-fogging film or a hydrophilic film is formed on the surface of a substrate such as glass, ceramic, plastic, or metal, etc. The abovementioned anti-fogging article according to the invention is used for building, vehicles, optical components, industrial applications, agriculture, daily-living articles, house material, and medical equipment. The abovementioned anti-fogging article according to the invention is suitable, for example, for window glass, mirrors, lenses, fins of heat exchanger of air conditioners, biomaterials, film sheets, showcases, etc. which are excellent in durability, wear resistance, anti-fogging, or hydrophilic property, etc.

What is claimed is:

1. An anti-fogging article being a film consisting essentially of
   (1) metal oxide fine particles having a grain size from 4 to 300 nm of 5 to 80% by weight,
   (2) negative-ionized surface-active agent of 0 to 15% by weight, and
   (3) a balance of metal oxides coated on a substrate,
   said film surface having dents and projections having an arithmetical mean average (Ra) from 1.5 to 80 nm and a mean interval (Sm) of dents and projections from 4 to 300 nm formed on said film surface.

2. An anti-fogging article as set forth in claim 1, wherein said metal oxide fine particles are fine particles of at least an oxide selected from a group consisting of silicon oxide, aluminium oxide, zirconium oxide, titanium oxide, and cerium oxide, and the matrix of said film is at least an oxide selected from a group consisting of silicon oxide, aluminium oxide, zirconium oxide, titanium oxide, and cerium oxide.

3. An anti-fogging article as set forth in claim 1, wherein said metal oxide fine particles include at least chain silica fine particles.

4. An anti-fogging article as set forth in claim 3, wherein said chain silica fine particles have a diameter from 10 to 20 nm and a length from 40 to 300 nm.

5. An anti-fogging article as set forth in claim 1, wherein said film has a thickness from 2 to 300 nm.

6. An anti-fogging article as set forth in claim 1, wherein a layer of organosilane or its hydrolyzed substance containing in the molecule at least a functional group which is selected from a group consisting of polyalkylene oxide group, alkyl group, alkenyl group, and aryl group is covered on said film, and dents and projections having an arithmetical mean roughness (Ra) from 1.5 to 80 nm and a mean interval (Sm) thereof from 4 to 300 nm are formed on the surface of the layer of said organosilane or its hydrolyzed substance.

7. An anti-fogging article as set forth in claim 6, wherein the layer of said organosilane or its hydrolyzed substance is from 0.3 to 10 nm thick.

8. An anti-fogging article as set forth in claim 6, wherein said organosilane is alkoxysilane or chlorosilane.

9. An anti-fogging article as set forth in claim 6, wherein said functional group is polyalkylene oxide group.

10. An anti-fogging article as set forth in claim 1, wherein said organosilane is trimethoxysilane.

11. An anti-fogging article as set forth in claim 1 wherein a layer of surface-active agent is covered on said film.

12. An anti-fogging article as set forth in claim 11, wherein said covered layer of surface-active agent is from 0.2 to 100 nm thick.

13. An anti-fogging article as set forth in claim 11, wherein said covered surface-active agent is a negative-ionized surface-active agent or non-ionized surface-active agent.

14. An anti-fogging article as set forth in claim 11, wherein said covered negative-ionized surface-active agent is dialkyl sodium sulfosuccinate.

15. An anti-fogging article as set forth in claim 11, wherein said covered non-ionized surface-active agent has a hydrophilicity/lipophilicity balance value (HLB) of 5 through 18.

16. An anti-fogging article as set forth in claim 11, wherein said covered surface-active agent is such that the same does not have any amine nitrogen or amide bond in its molecules.

17. An anti-fogging article as set forth in claim 1, wherein the negative-ionized surface-active agent included in said film is dialkyl sodium sulfosuccinate.

18. An anti-fogging article as set forth in claim 1, wherein the content ratio of said surface-active agent in the film is from 0.1 to 15 percent by weight.

19. An anti-fogging article as set forth in claim 1, wherein the initial contact angle with respect to water drops of 0.4 mg is 10 degrees or less.

20. A method for producing anti-fogging articles, being characterized in that a liquid consisting essentially of metallic oxide fine particles having a grain size of 4 through 300 nm and at least one selected from a group consisting of (1) metal alkoxide, all functional groups of which are alkoxyl groups (2) tetrachlorosilane, (3) hydrolyzed substance of said (1) and (2), and (4) negative-ionized surface-active agent 0 to 18% by weight with respect to the solid content of the liquid, are coated onto the surface of a substrate, dried and heated as necessary, to cause a dent and projection film of metal oxide to be formed on the surface of the substrate.

21. A method for producing anti-fogging articles, as set forth in claim 20, wherein said liquid contains said metal oxide fine particles, a metal alkoxide or hydrolyzed substances, and acids, and said metal alkoxide or its hydrolyzed substance is included therein at a ratio of 0.001 through 3 percents by weight when being converted to metallic oxide, acid is included at a ratio from 0.0010 to 1.0 mols per liter, and water is included at a ratio from 0.0010 to. 10 percents by weight.

22. A method for producing anti-fogging articles, as set forth in claim 21, wherein said metal alkoxide or its hydrolyzed substance is included at a ratio from 0.01 to 0.6 percents by weight when being converted to metal oxide, said acid is included at a ratio from 0.010 to 0.3 mols per liter, water is included at a ratio from 0.0010 to 3 percents by weight.

23. A method for producing anti-fogging articles, as set forth in claim 21, wherein said acid is nitric acid or hydrochloric acid.

24. A method for producing anti-fogging articles, as set forth in claim 20, wherein said metal oxide fine particles contain at least chain silica colloids.

25. A method for producing anti-fogging articles, as set forth in claim 20, wherein said liquid contains said metal oxide fine particles at a ratio from 5 percents or more by weight to 80 percents or less by weight with respect to the total quantity of said metal oxide fine particles, said metal alkoxide tetrachlorosilane, and their hydrolyzed substances.

26. A method for producing anti-fogging articles, as set forth in claim 20, wherein said metal oxide fine particles are composed of at least a metal oxide selected from a group consisting of silicon oxide, aluminium oxide, zirconium oxide, titanium oxide, and cerium oxide.

27. A method for producing anti-fogging articles, as set forth in claim 20, wherein said metal alkoxide is an metal alkoxide selected from a group consisting of silicon alkoxide, aluminum alkoxide, zirconium alkoxide and titanium alkoxide.

28. A method for producing anti-fogging articles, as set forth in claim 27, wherein said silicon alkoxide is tetraethoxysilane.

29. A method for producing anti-fogging articles, as set forth in claim 20, wherein said negative-ionized surface-active agent is dialkyl sodium sulfosuccinate.

30. A method for producing anti-fogging articles, as set forth in claim 20, wherein a surface-active agent contained in said liquid is at a ratio from 0.1 to 1.8 percent by weight with respect to the solid content of the liquid.

31. A method for producing anti-fogging articles, as set forth in claim 20, wherein a solvent of said liquid is an alcohol-based solvent.

32. A method for producing anti-fogging articles, as set forth in claim 20, wherein an organosilane or its hydrolyzed substance including, in its molecule, at least a functional group selected from a group consisting of polyalkylene oxide group, alkyl group, alkenyl group, and aryl group is brought into contact with a substrate on which a dent and projection film of said metal oxide is formed, in order to cause the molecules thereof to be combined with or adhered to the surface of said dent and projection film.

33. A method for producing anti-fogging articles, as set forth in claim 32, wherein a liquid including said organosilane or its hydrolyzed substance is coated onto said dent and projection surface of metal oxide, and they are dried in order to cause the molecules thereof to be chemically or physically fixed at or adhered to the dent and projection surface of metal oxide.

34. A method for producing anti-fogging articles, as set forth in claim 32, wherein said organosilane is alkoxysilane or chlorosilane.

35. A method for producing anti-fogging articles, as set forth in claim 32, wherein said functional group is a polyalkylene oxide group.

36. A method for producing anti-fogging articles, as set forth in claims 20, wherein a surface-active agent is further coated onto said anti-fogging articles.

37. A method for producing anti-fogging articles, as set forth in claim 36, wherein said surface-active agent is a non-ionized surface-active agent or a negative-ionized surface-active agent.

38. A method for producing anti-fogging articles, as set forth in claim 37, wherein said negative-ionized surface-active agent is dialkyl sodium sulfosuccinate.

39. A method for producing anti-fogging articles, as set forth in claim 37, wherein said non-ionized surface-active agent has a hydrophilicity/lipophilicity balance value (HLB) of 5 through 18.

40. A method for producing anti-fogging articles, as set forth in claim 36, wherein said surface-active agent does not have any amine nitrogen or amide bond in its molecules.

41. An anti-fogging article as set forth in claim 6, wherein a layer of surface-active agent is on said organosilane or its hydrolyzed substance layer.

* * * * *